(12) United States Patent
Blanchette et al.

(10) Patent No.: US 11,427,488 B2
(45) Date of Patent: Aug. 30, 2022

(54) DEVICES AND SYSTEMS FOR WATER TREATMENT

(71) Applicant: INNOVATIVE WATER CARE, LLC, Alpharetta, GA (US)

(72) Inventors: David W Blanchette, Bristol, CT (US); Matthew Muller, Cleveland, TN (US)

(73) Assignee: Innovative Water Care, LLC, Alpharetta, GA (US)

( * ) Notice: Subject to any disclaimer, the term of this patent is extended or adjusted under 35 U.S.C. 154(b) by 211 days.

(21) Appl. No.: 16/864,372

(22) Filed: May 1, 2020

(65) Prior Publication Data

US 2020/0346175 A1    Nov. 5, 2020

Related U.S. Application Data

(60) Provisional application No. 62/842,921, filed on May 3, 2019.

(51) Int. Cl.
| | | |
|---|---|---|
| *C02F 1/68* | (2006.01) | |
| *B01F 35/71* | (2022.01) | |
| *C02F 1/76* | (2006.01) | |
| *B01F 25/312* | (2022.01) | |
| *B01F 23/50* | (2022.01) | |
| *B01F 35/221* | (2022.01) | |
| *B01F 101/00* | (2022.01) | |

(52) U.S. Cl.
CPC ............ *C02F 1/688* (2013.01); *B01F 23/59* (2022.01); *B01F 25/31243* (2022.01); *B01F 35/2217* (2022.01); *B01F 35/7176* (2022.01); *C02F 1/76* (2013.01); *B01F 2101/305* (2022.01)

(58) Field of Classification Search
CPC .. C02F 1/688; C02F 1/687; C02F 1/76; B01F 25/31243; B01F 35/7176; B01F 23/59
See application file for complete search history.

(56) References Cited

U.S. PATENT DOCUMENTS

| | | |
|---|---|---|
| 3,864,090 A | 2/1975 | Richards |
| 4,208,376 A | 6/1980 | Sangster et al. |
| 4,250,911 A | 2/1981 | Kratz |
| 4,253,950 A | 3/1981 | Wojtowicz |
| | (Continued) | |

OTHER PUBLICATIONS

Extended European Search Report, dated Feb. 20, 2020, Application No. 17869402.2, 18 pages.

(Continued)

*Primary Examiner* — Lessanework Seifu
(74) *Attorney, Agent, or Firm* — Lorenz & Kopf, LLP

(57) ABSTRACT

The invention is an apparatus for preparing a chemical solution. A device of the present invention includes a housing including a lower chamber and an upper chamber and a dissolving bowl arranged at an interface of the lower chamber and upper chamber. The dissolving bowl includes a grid disposed within. Solid, undissolved chemical material rests on a top surface of the grid, such that the grid is able to maintain physical separation of the solid, undissolved chemical material from at least a bottom portion of the dissolving bowl. The device further includes a nozzle disposed within the dissolving bowl and positioned so as to direct flow of aqueous fluid into the dissolving bowl and towards the grid. The dissolving bowl further includes an outlet in fluid communication with the lower chamber to thereby allow for a prepared chemical solution to flow from the dissolving bowl into the lower chamber.

26 Claims, 14 Drawing Sheets

(56) References Cited

U.S. PATENT DOCUMENTS

| | | |
|---|---|---|
| 4,420,394 A | 12/1983 | Lewis |
| 4,462,511 A | 7/1984 | Fulmer et al. |
| 4,917,868 A | 4/1990 | Alexander et al. |
| D309,493 S | 7/1990 | Casberg |
| 4,964,185 A | 10/1990 | Lehn |
| 5,004,549 A | 4/1991 | Wood et al. |
| 5,089,127 A | 2/1992 | Junker et al. |
| RE33,861 E | 3/1992 | Zetena et al. |
| 5,112,521 A | 5/1992 | Mullins et al. |
| 5,133,381 A | 7/1992 | Wood et al. |
| 5,367,196 A | 11/1994 | Mahulikar et al. |
| 5,374,119 A | 12/1994 | Scheimann |
| 5,384,102 A | 1/1995 | Ferguson et al. |
| 5,419,355 A | 5/1995 | Brennan et al. |
| 5,427,748 A | 6/1995 | Wiedrich et al. |
| 5,441,711 A | 8/1995 | Drewery |
| 5,483,740 A | 1/1996 | Maslakow |
| 5,505,915 A | 4/1996 | Copeland et al. |
| 5,536,479 A | 7/1996 | Miller et al. |
| 5,608,267 A | 3/1997 | Mahulikar et al. |
| 5,650,663 A | 7/1997 | Parthasarathi |
| 5,713,384 A | 2/1998 | Roach et al. |
| 5,734,201 A | 3/1998 | Djennas et al. |
| 5,759,501 A | 6/1998 | Livingston et al. |
| 5,765,945 A | 6/1998 | Palmer |
| 5,810,043 A | 9/1998 | Grenier |
| 5,888,386 A | 3/1999 | Enright et al. |
| 5,905,632 A | 5/1999 | Seto et al. |
| 5,919,329 A | 7/1999 | Banks et al. |
| 5,928,608 A | 7/1999 | Levesque et al. |
| 5,929,513 A | 7/1999 | Asano et al. |
| 5,932,093 A | 8/1999 | Chulick |
| 5,970,319 A | 10/1999 | Banks et al. |
| 5,977,626 A | 11/1999 | Wang et al. |
| 6,022,480 A | 2/2000 | Girvan et al. |
| 6,045,706 A | 4/2000 | Morrison et al. |
| 6,057,601 A | 5/2000 | Lau et al. |
| 6,271,579 B1 | 8/2001 | Going et al. |
| 6,337,024 B1 | 1/2002 | Hammonds |
| 6,359,341 B1 | 3/2002 | Huang et al. |
| 6,409,859 B1 | 6/2002 | Chung |
| 6,432,742 B1 | 8/2002 | Guan et al. |
| 6,432,749 B1 | 8/2002 | Libres |
| 6,432,752 B1 | 8/2002 | Farnworth |
| 6,451,271 B1 | 9/2002 | Hammonds |
| 6,455,016 B1 | 9/2002 | Tsuneki |
| 6,482,358 B1 | 11/2002 | Kelsch et al. |
| 6,497,822 B2 | 12/2002 | Blanchette et al. |
| 6,534,859 B1 | 3/2003 | Shim et al. |
| 6,915,811 B2 | 7/2005 | Blanchette et al. |
| 7,083,717 B1 | 8/2006 | Hustelll et al. |
| 7,143,778 B2 | 12/2006 | Blanchette et al. |
| 7,401,973 B1 | 7/2008 | Lott |
| 7,993,579 B2 | 8/2011 | Williams et al. |
| 8,251,080 B1 | 8/2012 | Florkiewicz |
| 8,372,348 B2 | 2/2013 | Adams et al. |
| 8,459,284 B2 | 6/2013 | Brennan et al. |
| 10,293,310 B2 | 5/2019 | Blanchette et al. |
| 2002/0011436 A1 | 1/2002 | Blanchette et al. |
| 2002/0195404 A1 | 12/2002 | Pickens et al. |
| 2004/0004903 A1 | 1/2004 | Lins |
| 2005/0145277 A1 | 7/2005 | Blanchette et al. |
| 2008/0296214 A1 | 12/2008 | Blanchette |
| 2010/0163468 A1 | 7/2010 | Suzuki et al. |
| 2012/0067968 A1 | 3/2012 | Brennan et al. |
| 2012/0074052 A1 | 3/2012 | Brandreth |
| 2013/0215705 A1 | 8/2013 | Mueller |
| 2016/0016832 A1 | 1/2016 | Ferguson et al. |

OTHER PUBLICATIONS

International Search Report and Written Opinion issued in PCT/US2009/048434, dated Aug. 20, 2009, (6 pages).

PCT International Search Report and Written Opinion for the corresponding PCT/US2017/061517, dated Mar. 12, 2018, (13 pages total).

Examination Report issued in Indian Application No. 202147049500, dated Dec. 23, 2021, 7 pages.

International Search Report issued in International Application No. PCT/US2020/030944, dated Sep. 17, 2020, 8 pages.

DEVICES AND SYSTEMS FOR WATER TREATMENT

CROSS-REFERENCE TO RELATED APPLICATIONS

This application claims priority from U.S. Provisional Application No. 62/842,921, filed May 1, 2019, the contents of which are incorporated herein by reference.

TECHNICAL FIELD

The invention relates generally to water treatment, and, more particularly, to devices and systems for creating a chemical solution for water treatment.

BACKGROUND

Water is used in many commercial, industrial, and recreational applications. Depending on the specific end use, water may require specific treatments. The end use may include, but is not limited to, drinking, industrial water supply, irrigation, river flow maintenance, water recreation, or many other uses, including the safe return of used water to the environment. Water treatment generally improves the quality of the water by removing contaminants and undesirable components, or reduces their concentration so that the water becomes fit for its desired end use. When left untreated, water may cause corrosion or mechanical failure of equipment to occur, resulting in costly repairs. Furthermore, in certain applications, if left untreated, water may provide for growth of bacteria, algae, and other undesirable organisms, such that persons exposed to an untreated water supply, either by way of ingestion or direct physical contact, may become ill and face serious medical issues, and possibly death.

Common water treatment practices generally rely on the introduction of treatment chemicals to control such organisms on a periodic or continuous basis. For example, some water treatment systems use chemical feeders that bring water into contact with solid, dry treatment chemicals. The feeders are designed to dissolve chemical material in the water in a controlled manner. In conventional chemical feeders, solid pellets of calcium hypochlorite ("cal hypo") are dissolved to introduce chlorine into the water stream. Chlorine in the water is generally expressed as a concentration of free available chlorine (FAC). In order to provide dissolution at a desired rate to maintain the desired FAC concentration, conventional chemical feeders often require extensive maintenance. Chemical materials must be added to the device frequently, and maintenance is also required to remove the accumulation of deposits or residue on the device, such as calcium carbonate deposits. As such, current chemical feeder designs generally require considerable supervision and intervention (i.e., monitoring equipment and handling of chemical materials) to ensure the chemical feeder is functioning as intended, which can be arduous and time consuming and further result in a user being exposed to chemicals during handling thereof.

SUMMARY

The present invention relates to devices and systems for water treatment. In particular, devices according to the present invention are configured to prepare chemical solutions to be introduced into a water supply. The devices may be referred to herein as erosion feeders or chemical feeder, for example. As such, devices of the present invention are configured to be tied into an overall water treatment system. Such a water treatment system may generally consist of a water source, one or more pumps for providing flow of water through various pathways (e.g., piping), one or more valves for controlling input and output into and out of the pathways, one or more physical components for filtering or screening the water, as well as the erosion feeder devices of the present invention. The overall water treatment system may be associated with a circulating system, such as a pool treatment system in which pool water is circulated and treated in a continuous fashion, or may be associated with a water treatment plant for a given body of water (e.g., river, lake, reservoir, etc.). The erosion feeder devices of the present invention are configured to prepare and output a high concentration of chemical solution, minimize user interaction with chemical materials, and minimize scale deposition on the devices, thereby addressing the drawbacks of conventional chemical feeders.

It should be noted that, while the following description is directed to devices and systems to be used in the treatment of pool water, the devices and systems of the present invention can be used in other water treatment applications in general, and are not limited to pool treatment systems.

A device of the present invention includes a housing including a lower chamber and an upper chamber and a dissolving bowl arranged at an interface of the lower chamber and upper chamber. The dissolving bowl includes a grid disposed within. The upper chamber is generally in the form of a hopper, such that a chemical material can simply be loaded into the upper chamber and, by way of gravity, the chemical material passes into the dissolving bowl and is supported by the grid. The grid is designed such that solid, undissolved chemical material (of a particular size and/or dimension, such as briquettes or tablets) rests on a top surface of the grid, such that the grid is able to maintain physical separation of the solid, undissolved chemical material from at least a bottom portion of the dissolving bowl. The device further includes a nozzle disposed within the dissolving bowl and positioned so as to direct flow of aqueous fluid (i.e., water) into the dissolving bowl and towards the grid, which results in filling of the dissolving bowl with the aqueous fluid and eventual contact between the aqueous fluid and the chemical material supported upon the grid. The fluid flow from the nozzle is controllable such that a desired amount of chemical material is dissolved (based on the flow of aqueous fluid from the nozzle) within the dissolving both and mixed to create a chemical solution of a desired concentration. The dissolving bowl further includes an outlet in fluid communication with the lower chamber to thereby allow for a prepared chemical solution to flow from the dissolving bowl into the lower chamber. The chemical solution may then be subjected to further fluid flow to thereby introduce a volume of the chemical solution into the overall water treatment system to mix with the water to be treated.

The devices of the present invention are designed to produce an ideal concentration of chlorine, in contrast to conventional chemical feeders. For example, conventional chemicalfeeders, such as cal hypo erosion chlorinators, generally produce a low concentration of solution, which, in turn, requires the use of a centrifugal pump to remove the high volume of low concentration solution from the chemical feeder and into the overall water supply/filter system (i.e., a pool or the like). The chlorine concentration passing through the pump can cause failure of the pump in a short period of time. In contrast to conventional systems and devices, a higher concentration of chlorine is produced by the devices of the present invention, such that a pump and venturi injector are used to remove a sufficient volume of a prepared chemical solution from the device to thereby treat a large commercial swimming pool, for example.

Nozzles used in the invention have an entrainment feature that recirculates the solution in the dissolving bowl sufficiently to cause more intimate contact of the solution with the briquettes/tablets, thereby increasing the concentration before the solution exits the dissolving bowl. The position (height) of the outlet and cross sectional area is such that the solution will rise up into the briquette/tablet bed when about 2 to about 4 gpm of flow is put through the inlet nozzle. When flow is terminated, the solution drops below the top of the grid, thereby keeping the chemical out of the water and stopping the dissolution process. Such a feature maintains a consistent high chlorine concentration (about 0.8%) and prevents briquette/tablet mushing.

The bottom surface of the grid is pointed, which allows the water to more freely flow towards the briquettes/tablets sitting on top of the grid, thereby enhancing the impact on the briquettes from the flow out of the nozzle. In contrast, a flat surface would diminish the impact of water flow towards the briquettes/tablets. In addition, there is a hole in the grid directly above the nozzle horn. The hole allows the high volume of flow from the nozzle to penetrate into the bed unimpeded by any deflection from the grid. This results in a higher concentration of solution than would be attained without the hole. The grid has about a ¼ inch open square pattern. The top and the bottom of the grid are pointed, and beams have an elliptical shape. The thickness of the grid is about ½ inch, measuring from the bottom point to the top point of each elliptically-shaped grid beam. In certain embodiments, the beams and grid are created by injection molding.

The about ¼ inch square openings allow sufficient flow through the grid while holding the solid chemical pieces above the grid until the chemical solids are small enough to be of no consequence. If the chemical solids are too large and fall to the bottom of the dissolving bowl where the nozzle is located, the nozzle could become blocked. In particular, if the pieces were too big, the nozzle would experience diminished flow due to a blocked entrainment feature, thereby lowering the dissolving rate of the tablets and chlorine output rate of the entire system. The grid pattern of about ¼ inch open square between structural components of the grid provides the highest concentration without allowing briquette fragments large enough to impede entrainment to fall through the grid into the dissolving bowl.

Typically, users come into contact with harmful chemicals when loading a water treatment device with the chemical material. For example, in conventional chemical feeders, loading the feeders with solid briquettes or tablets of chemical material creates airborne chemical dust. Inhalation and other contact of chemicals used for water treatment, such as cal hypo, can cause severe burning and irritation of the eyes, skin, nose, and throat. The invention provides a dustless feature that prevents airborne chemical material, thereby avoiding the possibility of chemical dust inhalation. The invention provides a dustless loading feature of the briquettes/tablets using with a bucket/hopper mating system. The lid of the bucket containing chemical materials is removed and replaced with a funnel-type lid. The funnel-type lid has an interlocking feature that holds the funnel securely on the bucket. Once the funnel-type lid is securely installed on the bucket, the bucket can be lifted and inverted onto a female feature on the hopper or upper chamber. Such a transition allows for the placement of the bucket onto the hopper with virtually no dust escaping during the process. Rotating the bucket interlocks the bucket on the hopper. The bucket can be removed once the dust settles inside the feeder, typically after a few minutes. As another option, the bucket can be left in place to serve as the lid for the upper chamber. A third option is to use the bucket for extra capacity. When the bucket is used for extra capacity, the bucket is inverted onto a hopper or upper chamber which is nearly full of briquettes/tablets. The funnel-type lid is interlocked onto the hopper, increasing the chemical material capacity in the hopper by nearly 50 pounds. Such features are desirable when maintenance operators are unavailable, such as during long weekends.

The invention provides water treatment devices that avoid scale deposition. Conventional cal hypo erosion chlorinators suffer from scale deposition. Scale deposition on the grid and the build-up of insoluble particulates in the feeder cause maintenance issues requiring acid cleaning and mechanical removal of the solids. However, the present invention minimizes the deposition of scale by providing a shaped grid. The shape at the top of the grid is pointed with almost no horizontal surface area, preventing water from sitting on the top of the grid and minimizing the deposition of scale typically produced on a horizontal portion of a grid supporting cal hypo briquettes/tablets when the surface dries out between feed episodes.

Moreover, the thickness of the grid allows the bottom of the grid to stay submerged under the water. In some embodiments, the grid thickness is about ½ inch. Because the bottom of the grid stays submerged, the invention prevents the drying process between feed episodes during which the layer of scale is typically deposited. Therefore, the invention keeps the bottom of the grid relatively free from scale build-up.

The grid also protects the outlet from being plugged by any briquettes or tablets or portions thereof so that uniform, optimum flow is achieved through the dissolving bowl. In the event that the outlet does somehow still become blocked, there are a series of overflow holes in the dissolving bowl that keep the chemical feeder from overflowing cal hypo solution. In an embodiment, the dissolving bowl comprises about eight overflow holes.

Furthermore, devices of the invention are designed to avoid accumulation of solids that may cause blockage within the device or system. The outlet flow of the dissolving bowl is directed to fall near the outlet port for the feeder to enhance the removal of solids from the feeder base. Gravity is used to supply the energy needed to agitate the solution in the base, thereby suspending the particles so they can be more easily removed with the outlet flow. The base of the feeder is contoured such that it facilitates the suspension of solids when combined with the agitation flow supplied by either fresh pool water or recirculated solution in the feeder based with flow generated by a mag drive recirculation pump. The suspension of solids allows for removal of the solids as the chlorinated solution is evacuated from the base tank with either a dosing pump or venturi. The placement of the inlet or recirculating flow works in conjunction with the contour of the base to direct the flow of solids to the central portion of the tank. At the central portion of the tank, the solids are pulled through the recirculation system, such as in a municipal design embodiment, or directed to the outlet valve, such as in a pool embodiment.

In certain embodiments, calcium hypochlorite, which is made by chlorinating lime, is the type of chlorine used in the feeder. The process produces calcium hypochlorite at about 68-72% purity. The other about 30% is made up of inert salts, mostly calcium, with about 3% being calcium carbonate or chalk, which is nearly insoluble. The calcium carbonate ($CaCO_3$) must be kept suspended in order to flow out of the bowl with the chlorinated solution. The shape of the bowl, including the slope of the walls and having the nozzle in the middle, facilitates the movement of the insoluble particles towards the nozzle, where the most vigorous agitation of the solution keeps the insoluble material in suspension. The inlet flow through the nozzle orifice creates a high velocity stream through the horn of the nozzle. The high velocity stream creates a low pressure that pulls the surrounding fluid in the bowl into the stream, thereby increasing the overall flow through the horn by about 3-4 fold. The increase is overall flow with inlet flow of about 3 gpm creates a flow through the nozzle horn of approximately about 9-12 gpm. That entrainment feature is used in the invention to suspend the solids for removal from the feeder dissolving bowl.

Additionally, the invention reduces the amount of maintenance required for conventional chemical feeder devices. The direction of the solid particles to the inlet of the recirculation pump has the added benefit of reducing the size of the particles, such as by pulverization, as the particles pass through the recirculation pump, allowing for easier suspension of the smaller particles. If particles stay in suspension, the particles are removed by the outlet flow from the feeder. Research has shown that particles with greater than about 800 micron diameters are difficult to keep in suspension with agitation. The particles are retained inside the feeder and require maintenance of the feeder with physical removal.

In the invention, the fresh pool water agitation uses very high pulsed flow directed to lift particles into suspension for removal with the outlet flow, which is in stark contrast to the lower flow continuous flush systems used in conventional systems. The pulsed flow is necessary to avoid overwhelming the outlet flow capacity while providing the energy required to suspend, or flush, particulates from the feeder base tank.

In one aspect, the invention is directed to an apparatus for preparing a chemical solution. The apparatus comprises a housing comprising a lower chamber and an upper chamber. A dissolving bowl is arranged at an interface of the lower chamber and upper chamber, the dissolving bowl comprising an open-ended top rim portion in communication with the upper chamber for receiving a chemical material therefrom and a closed bottom portion. A grid is disposed within the dissolving bowl and arranged between the top rim portion and the closed bottom portion of the dissolving bowl, the grid for supporting solid, undissolved chemical material on a top surface thereof and maintaining physical separation of solid, undissolved chemical material from at least the bottom portion of the dissolving bowl. A nozzle is disposed within the dissolving bowl and positioned proximate the bottom portion, the nozzle is arranged to direct flow of aqueous fluid into the dissolving bowl and towards the grid to thereby cause aqueous fluid to contact and dissolve at least some chemical material and create a chemical solution of aqueous fluid and dissolved chemical material based, at least in part, on fluid flow from the nozzle.

The grid generally comprises a framework of beams, including a first set of beams and a second set of beams arranged relative to one another. Each beam in the first and second sets includes a substantially elliptical cross-sectional shape. For example, each beam includes two opposing, arcuate sidewalls that converge with one another at respective top and bottom ends of each sidewall to form corresponding top and bottom surfaces of the beam. The first set of beams are substantially parallel with and spaced apart from one another and oriented in a first direction and the second set of beams are substantially parallel with and spaced apart from one another and oriented in a second direction perpendicular to the first direction. Accordingly, the first and second sets of beams traverse one another to thereby form a plurality of square-shaped openings defined therebetween. The plurality of square-shaped openings allow fluid to flow therethrough and thereby make contact with chemical material supported on the grid. It should be noted that, in other embodiments, the beams may be arranged so as to form other shapes for the openings, such as diamond, rectangle, and triangle, to name a few.

The grid may include a central opening substantially aligned with the nozzle to allow unimpeded fluid flow from the nozzle through the grid. Accordingly, in some embodiments, the nozzle may be centrally positioned within the dissolving bowl. By providing a central opening aligned with the nozzle, fluid from the nozzle may generally pass through the grid in an unobstructed manner, thereby increasing the agitation of water with the chemical material. The nozzle may generally include an eductor oriented to discharge fluid in a direction towards the grid and away from the bottom portion of the dissolving bowl.

The dissolving bowl may include a plurality of apertures arranged about the top rim portion. The plurality of apertures is in communication with the lower chamber and allow for overflow of fluid to pass from the dissolving bowl to the lower chamber. Accordingly, the apertures allow for controlling overflow of fluid and preventing potential spillover.

In some embodiments, the upper chamber includes an opening for loading of chemical material into the housing and into the dissolving bowl. The opening comprises a connection fitting configured to engage with a corresponding connection fitting of a separate bucket member containing a chemical material. The connection fittings of the opening of the upper chamber and the bucket member comprise interlocking engagement fittings configured to releasably couple the bucket member to the upper chamber. The bucket member comprises a lid coupled thereto, wherein the lid comprises a funnel-shaped body tapering in diameter from a wider first end directly coupled to an open end of the bucket member to a narrower second end positioned a distance from the first end and away from the bucket member.

In some embodiments, the dissolving bowl comprises an outlet provided along a portion of a sidewall of the dissolving bowl and proximate to the grid, the outlet in fluid communication with the lower chamber and allowing for chemical solution to flow from the dissolving bowl into the lower chamber. The outlet is substantially aligned with at least a bottom surface of the grid such, upon termination of fluid flow from the nozzle, a settled volume of fluid retained within the dissolving bowl falls below the top surface of the grid while remaining in contact with the bottom surface of the grid. The outlet flow from the dissolving bowl is directed to fall into the lower chamber near a chemical solution outlet port of the apparatus. The lower chamber comprises a contoured base with a low section defined at a center the contoured base. The inlet flow provided to the lower chamber functions in combination with the contoured base to direct flow of any solid, undissolved chemical material included in the chemical solution towards the low section of the contoured base to thereby remove the solid, undissolved chemical material from the chemical solution and away from the outlet port of the apparatus.

In certain embodiments, systems for preparing a chemical solution are provided. Systems comprise a chemical feeder, a pump for pumping aqueous fluid into the chemical feeder, and a controller communicatively coupled with the chemical feeder and the pump and configured to control the pump and aqueous fluid flow through the chemical feeder. The chemical feeder comprises a dissolving bowl arranged within a housing and comprising an open-ended top rim portion in communication with the upper chamber for receiving a chemical material therefrom and a closed bottom portion. A grid is disposed within the dissolving bowl and arranged between the top rim portion and the closed bottom portion of the dissolving bowl, the grid for supporting solid, undissolved chemical material on a top surface thereof and maintaining physical separation of solid, undissolved chemical material from at least the bottom portion of the dissolving bowl. A nozzle is disposed within the dissolving bowl and positioned proximate the bottom portion, the nozzle arranged to direct flow of aqueous fluid into the dissolving bowl and towards the grid to thereby cause aqueous fluid to contact and dissolve at least some chemical material and create a chemical solution of aqueous fluid and dissolved chemical material based, at least in part, on fluid flow from the nozzle.

The controller provides pulsed flow through the chemical feeder. A pulse of fluid flow from the nozzle causes a fluid level to rise to above a top surface of the grid. Stopping the pulse of fluid flow from the nozzle causes the fluid level to drop below the top surface of the grid.

In some embodiments, the system further comprises a recirculation pump that recirculates fluid and material in the chemical feeder and reduces particle size of solid chemical material. The chemical material is calcium hypochlorite.

DETAILED DESCRIPTION

By way of overview, the present invention is directed to devices and related systems for preparing a chemical solution. The invention is useful for water treatment, as devices and systems of the invention prepare chemical solutions by mixing chemical material with an aqueous fluid (i.e., water in most cases) and providing the chemical solution to water undergoing treatment. In certain embodiments, the chemical material is calcium hypochlorite ($Ca(OCl)_2$), also known as cal hypo. However, it should be noted that any chemical material may be used. Often, cal hypo is provided in solid form as briquettes or tablets. The devices of the present invention dissolve the briquettes or tablets to prepare a chemical solution for water treatment. Accordingly, the devices may be referred to herein as erosion feeders or chemical feeder, for example. The erosion feeder devices of the present invention may be particularly useful for commercial swimming pool chlorination, municipal drinking water chlorination, agricultural water chlorination, and industrial water chlorination.

Figure 3:
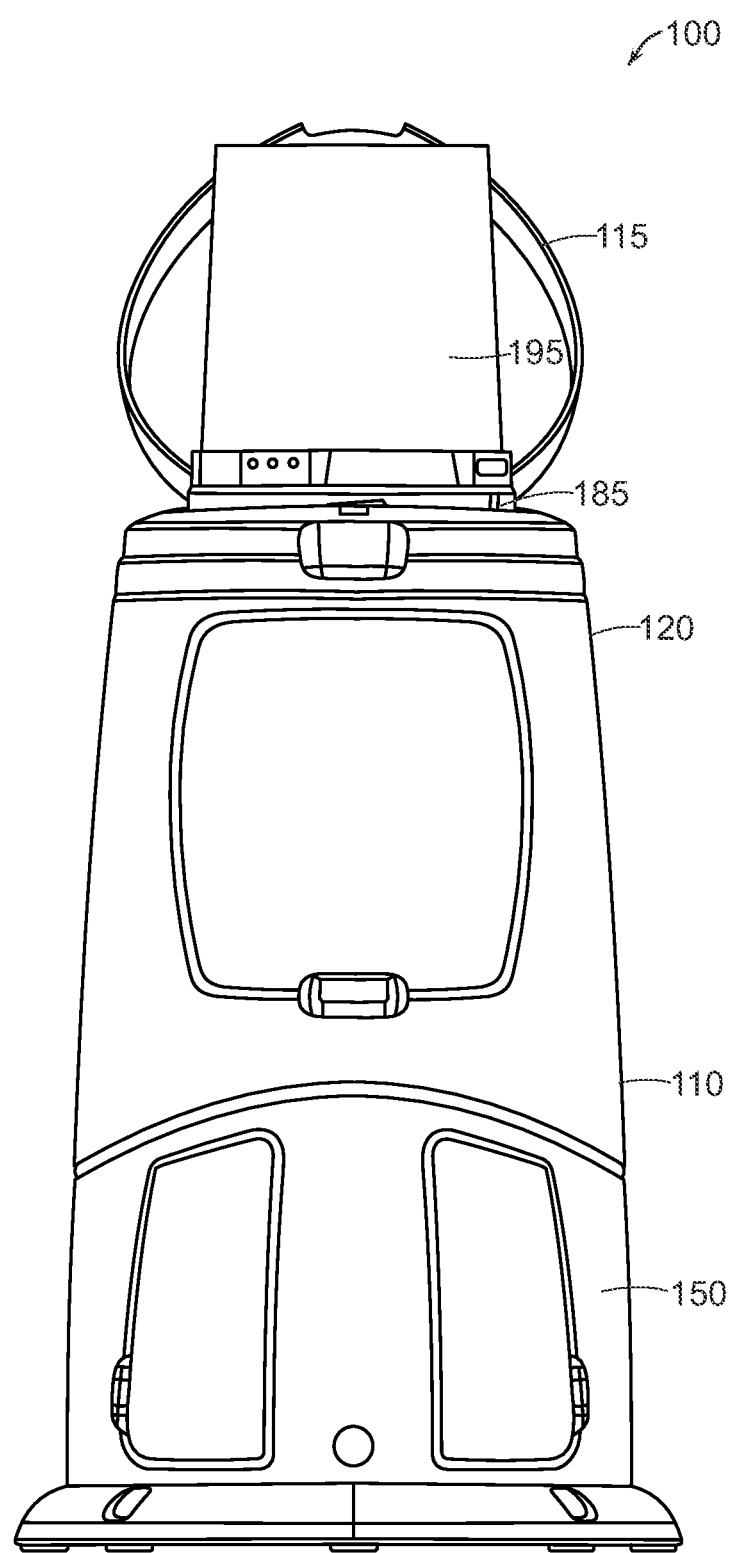
FIG. 3 shows a front view of an embodiment of a water treatment device.
Figure 4:
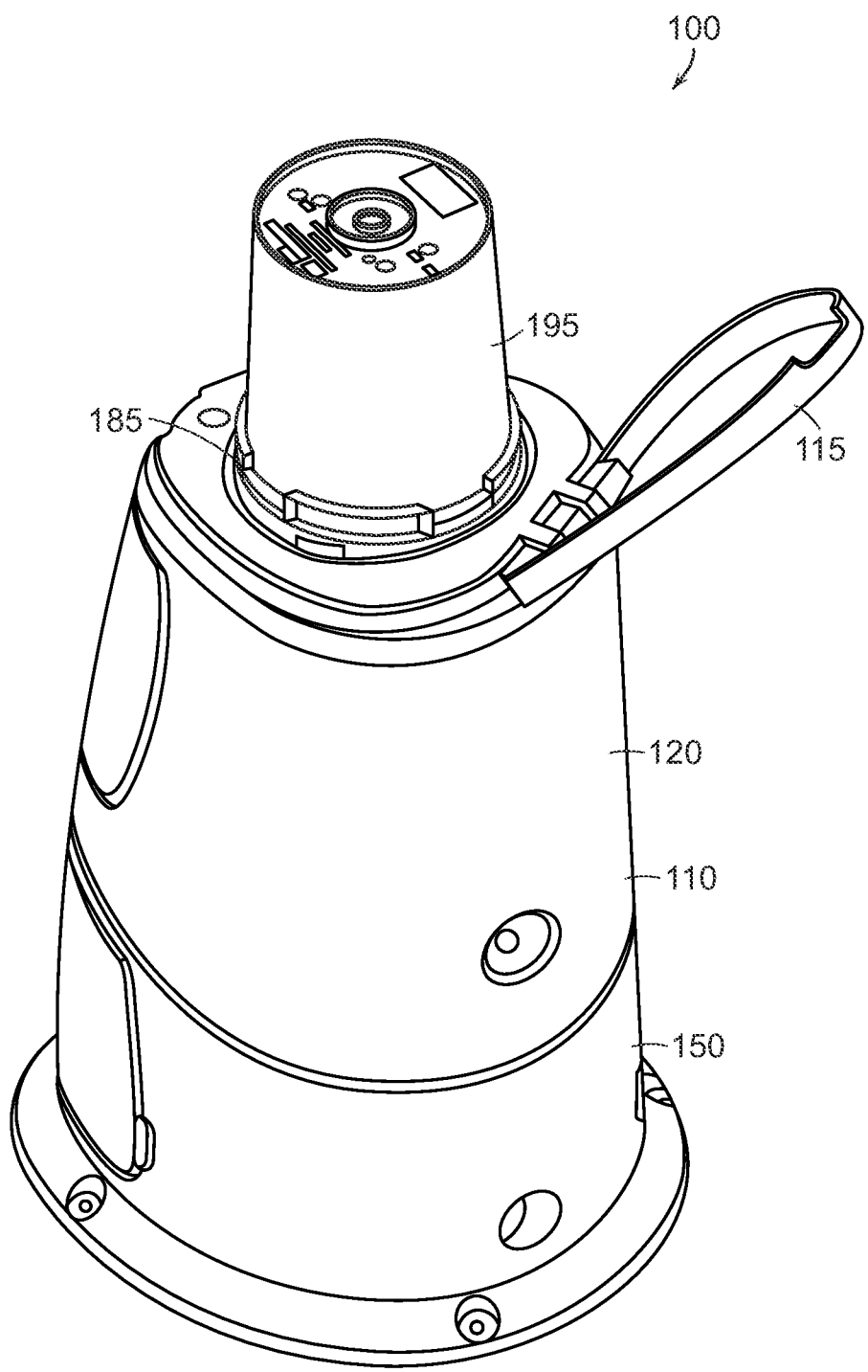
FIG. 4 shows a perspective view of an embodiment of a water treatment device.

FIGS. 3 and 4 show front and perspective views of an embodiment of a water treatment device 100 consistent with the present disclosure. The device 100 includes a housing 110 including a lower chamber 150 and an upper chamber 120. As shown, a bucket 195, loaded with a chemical material, such as tablets, is coupled to an opening 185 of the upper chamber 120, which in turn fills the upper chamber 120 with the chemical tablets. The upper chamber 120 may further include a lid 115. Accordingly, upon transferring the chemical material from the bucket 195 to the upper chamber 120, the bucket 195 may be removed and the lid 115 may be closed over the opening 185 so as to cover the opening 185 and the chemical tablets within.

Figure 1:
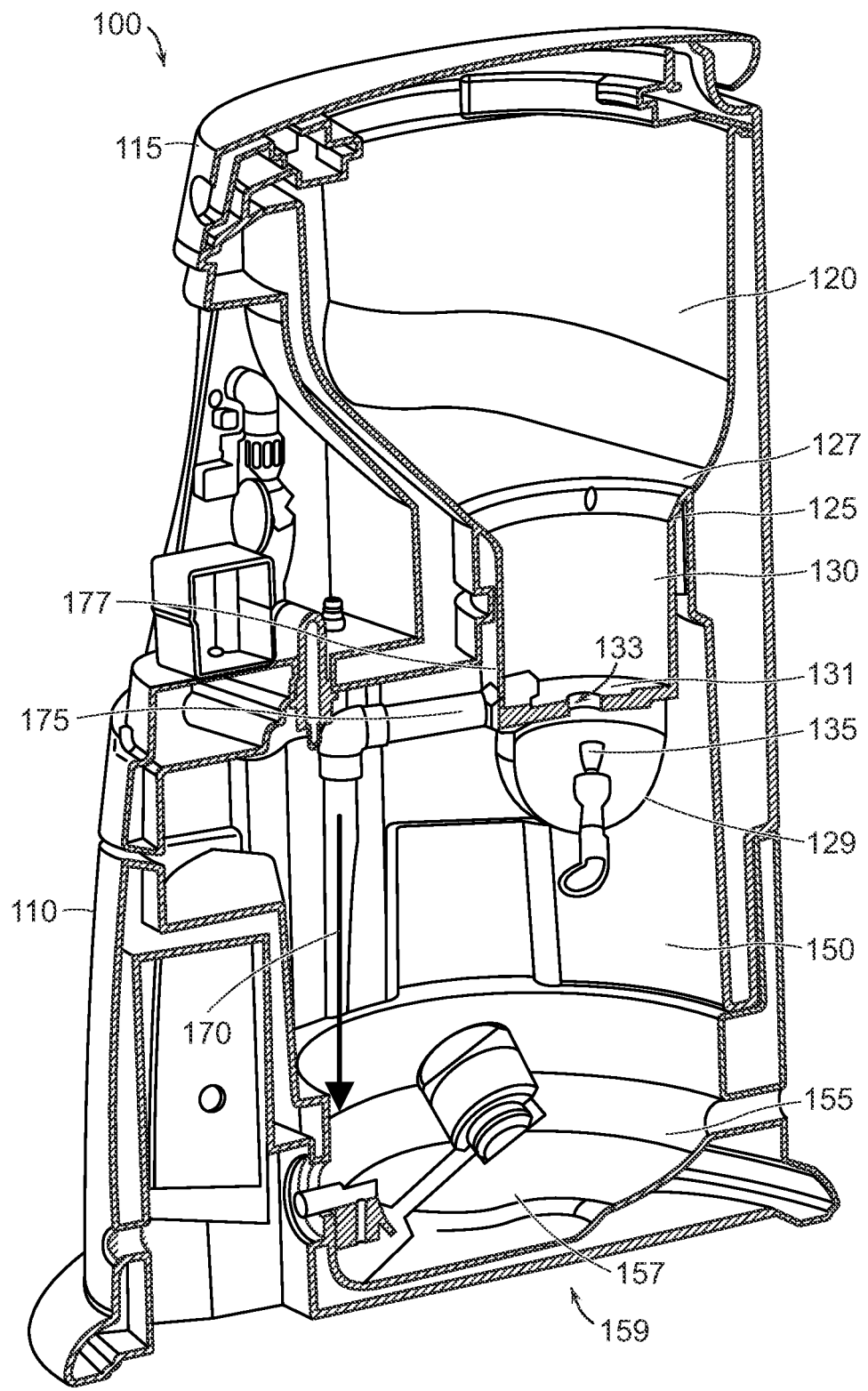
FIG. 1 shows a cross-sectional view of an embodiment of a water treatment device.
Figure 2:
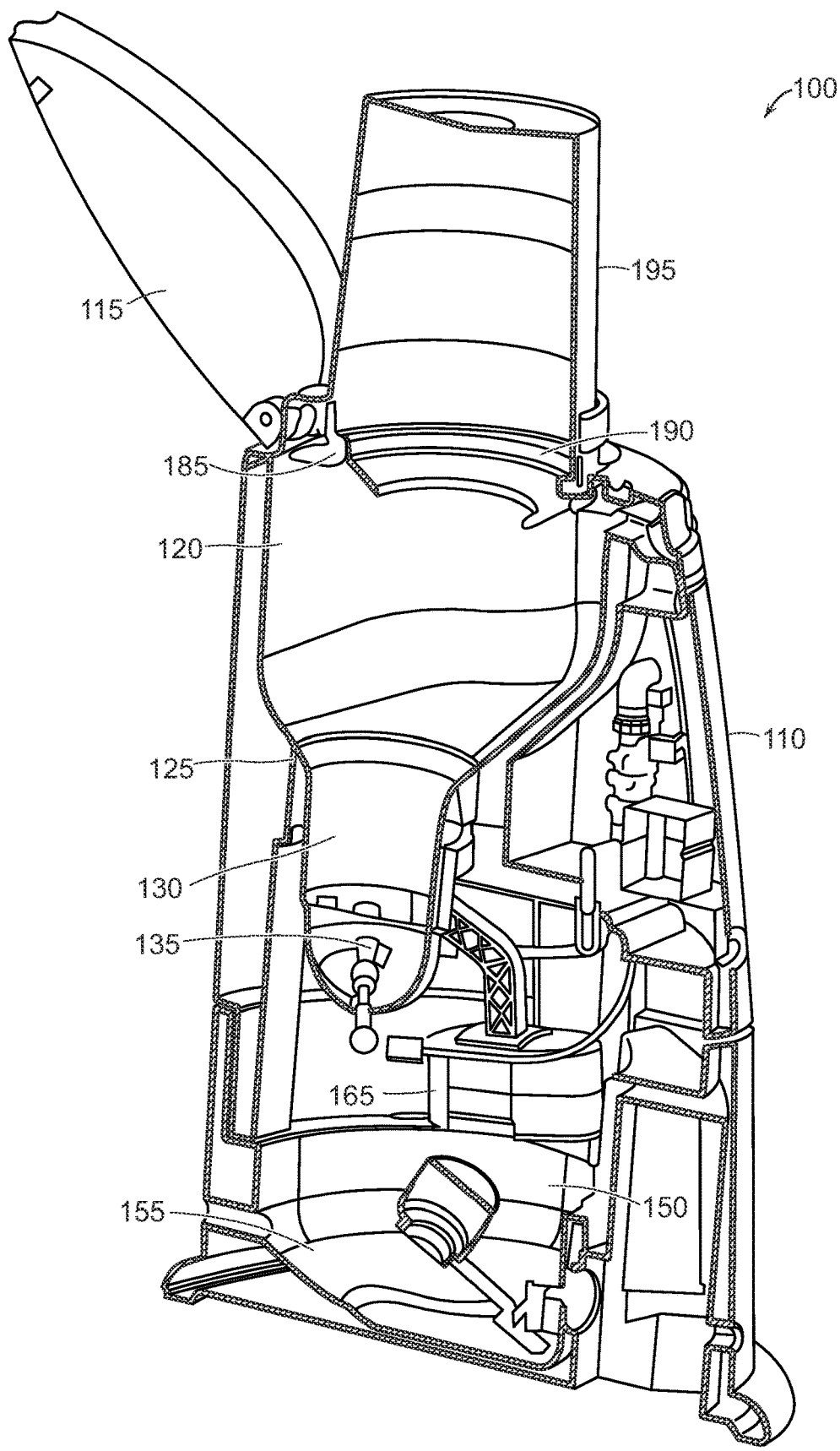
FIG. 2 shows a cross-sectional view an embodiment of a water treatment device.

FIGS. 1 and 2 show cross-sectional views of an embodiment of a water treatment device 100. In FIG. 1, the lid 115 to the upper chamber 120, or hopper, is closed. In FIG. 2, the lid 115 to the upper chamber 120 is open, with a bucket 195 for chemical materials having a funnel lid 190 coupled to the opening 185 of the upper chamber 120. The housing 110 comprises a lower chamber 150 and an upper chamber 120. A dissolving bowl 177 is arranged at an interface 127 of the lower chamber 150 and upper chamber 120. The dissolving bowl 177 comprises an open-ended top rim portion 125 in communication with the upper chamber 120 for receiving a chemical material therefrom and a closed bottom portion 129.

A grid member 131, sometimes referred to as a "grid," is disposed within the dissolving bowl 177 and arranged between the top rim portion 125 and the closed bottom portion 129 of the dissolving bowl 177. As shown, the grid portion 137 is generally in the form of a bucket, including a continuous sidewall 130 (annular in profile) extending from a base, in which a grid is formed, towards an open end. The grid portion 137 is further illustrated in FIG. 7, and is shaped and/or sized to correspondingly fit within the dissolving bowl 177 in a nesting arrangement, such that the grid portion 137 (at the base of the grid member 131) rests within the dissolving bowl 177 and is retained a distance from the bottom portion 129 of the dissolving bowl 177. The grid member 131 is configured to support a solid, undissolved chemical material (of a particular size and/or dimension) on a top surface thereof and maintain physical separation of the chemical material from at least the bottom portion 129 of the dissolving bowl 177. As shown, the grid portion at the base of the grid member 131 comprises a central opening 133 substantially aligned with a nozzle 135 to allow unimpeded fluid flow from the nozzle 135 through the grid portion.

The nozzle 135 is disposed within the dissolving bowl 177 and positioned proximate the bottom portion 129. The nozzle 135 is arranged to direct flow of aqueous fluid into the dissolving bowl 177 and towards the grid portion to thereby cause aqueous fluid to contact and dissolve at least some chemical material and create a chemical solution of aqueous fluid and dissolved chemical material based, at least in part, on fluid flow from the nozzle 135. The nozzle 135 is centrally positioned within the dissolving bowl 177. In some examples, the nozzle 135 comprises an eductor oriented to discharge fluid in a direction towards the grid member 131 and away from the bottom portion 129 of the dissolving bowl 177.

In some instances, it may be necessary to shut down fluid flow from the nozzle 135 as soon as possible to avoid potential damage to the device 100, particularly in instances where pressure may build up and present a potentially dangerous situation. Accordingly, the device 100 further comprises an emergency shut off valve 165 to provide immediate shut down of the nozzle 135 and other fluid flow components of the device 100.

The upper chamber 120 includes an opening 185 for loading of chemical material into the housing 110, particularly into the upper chamber 120 and further into the dissolving bowl 177. The dissolving bowl 177 comprises an outlet 175 provided along a portion of a sidewall of the dissolving bowl 177 and proximate to the grid portion at the base of the grid member 131. As shown, the outlet 175 is generally in fluid communication with the lower chamber 150 and allows for chemical solution to flow from the dissolving bowl 177 into the lower chamber 150. The outlet 175 is substantially aligned with at least a bottom surface of the grid portion such that, upon termination of fluid flow from the nozzle 135, a settled volume of fluid retained within the dissolving bowl 177 falls below the top surface of the grid portion while remaining in contact with the bottom surface of the grid portion. The outlet flow 170 from the dissolving bowl 177 is directed to fall into the lower chamber 150 near a chemical solution outlet port 159 of the apparatus. The lower chamber 150 comprises a contoured base 155 with a low section 157 defined at a center the contoured base 155. The inlet flow provided to the lower chamber 150 functions in combination with the contoured base 155 to direct flow of any solid, undissolved chemical material included in the chemical solution towards the low section 157 of the contoured base 155 to thereby remove the solid, undissolved chemical material from the chemical solution and away from the outlet port of the apparatus.

Figure 5:
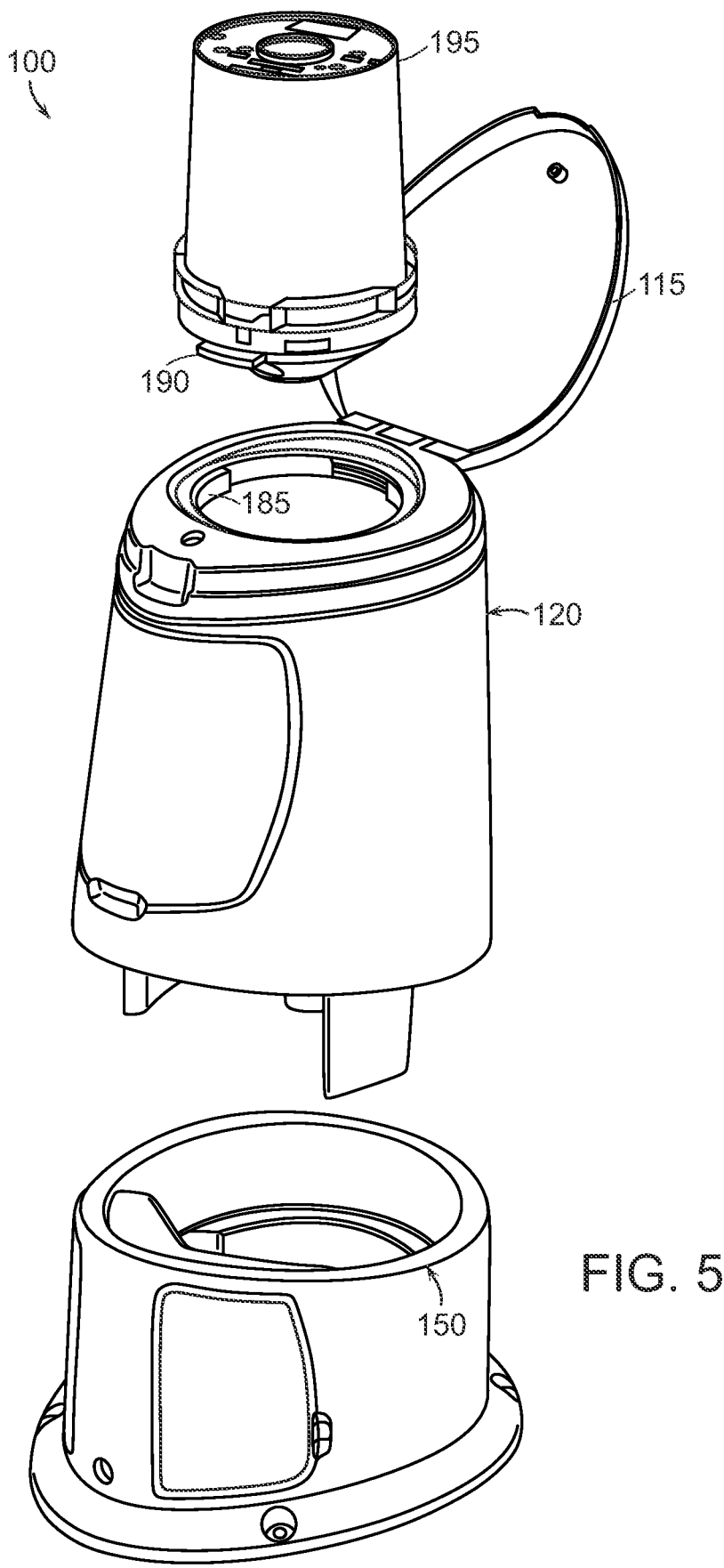
FIG. 5 shows assembly of an embodiment of a water treatment device.
Figure 6:
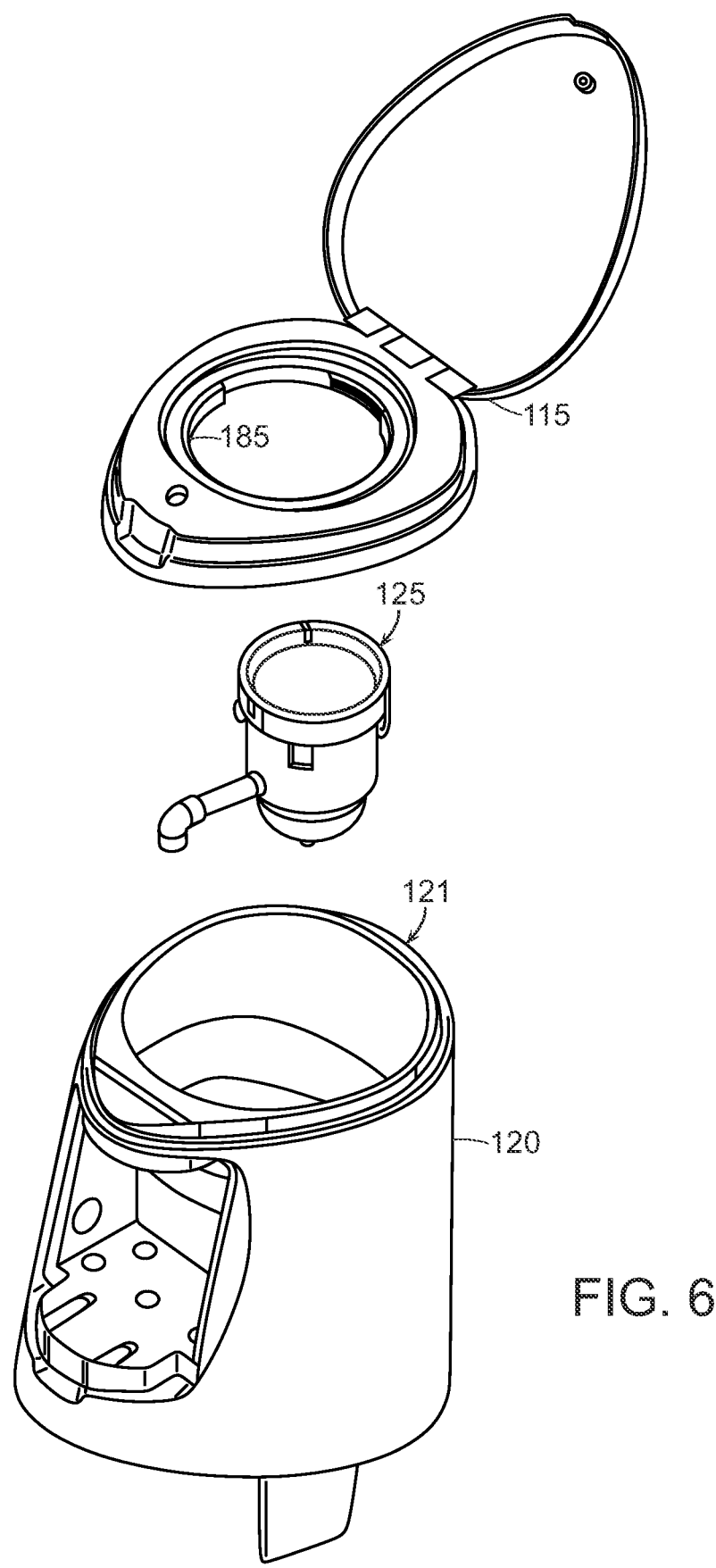
FIG. 6 shows assembly of an upper chamber according to an embodiment of a water treatment device.

FIG. 5 shows an exploded view of an assembly of a water treatment device 100. A bucket 195 containing chemical material is inverted. A funnel lid 190 is releasably coupled to the bucket 195. The funnel lid 190 comprises interlocking features that interlock with an opening 185 of the upper chamber 120. The upper chamber 120 is attached to the lower chamber 150. FIG. 6 shows an exploded view of an assembly of an upper chamber 120 of a water treatment device of the invention. A dissolving bowl 177 is disposed within the upper chamber 120. A lid 115 for the upper chamber 120 is arranged at a top of the upper chamber 120. The lid 115 has an opening 185 for loading chemical materials into the upper chamber 120.

Figure 7:
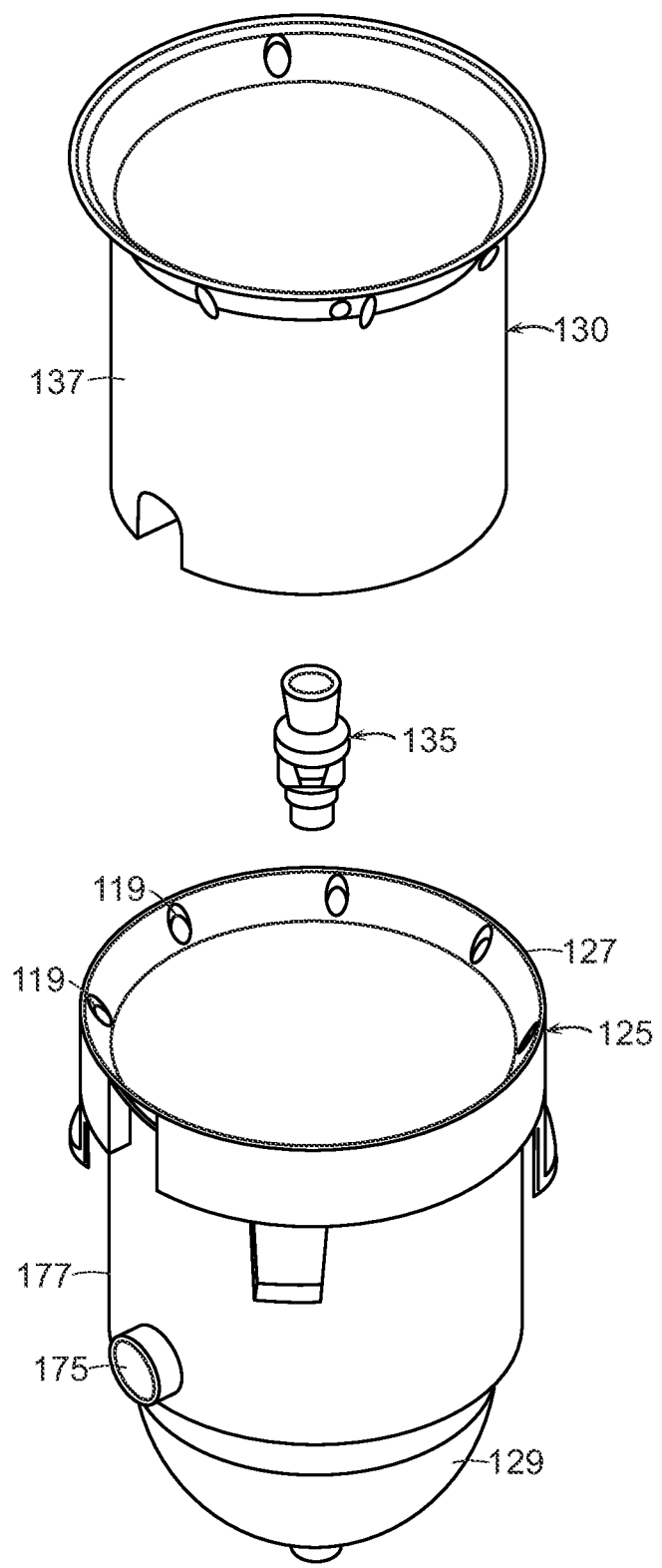
FIG. 7 shows assembly of a dissolving bowl according to an embodiment of a water treatment device

FIG. 7 shows assembly of a dissolving bowl 177. The dissolving bowl 177 has a plurality of apertures 119 arranged about the top rim portion 125. The plurality of apertures 119 are in communication with the lower chamber and allow for overflow of fluid to pass from the dissolving bowl 177 to the lower chamber. A grid member 131 is disposed within the dissolving bowl. The grid member 131 comprises a central opening substantially aligned with a nozzle 135 to allow unimpeded fluid flow from the nozzle 135 through the grid 131. The nozzle 135 is disposed within the dissolving bowl 177 and positioned proximate the bottom portion of the dissolving bowl 177. The nozzle 135 is arranged to direct flow of aqueous fluid into the dissolving bowl 177 and towards the grid portion at the base of the grid member 131 to thereby cause aqueous fluid to contact and dissolve at least some chemical material and create a chemical solution of aqueous fluid and dissolved chemical material based, at least in part, on fluid flow from the nozzle 135. The nozzle 135 is centrally positioned within the dissolving bowl 177.

Figure 8:
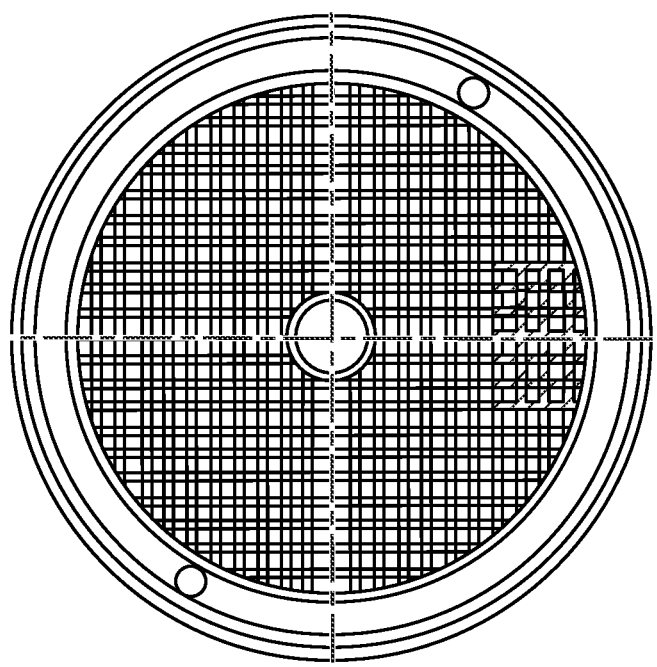
FIG. 8 shows a top view of an embodiment of a grid.
Figure 9:
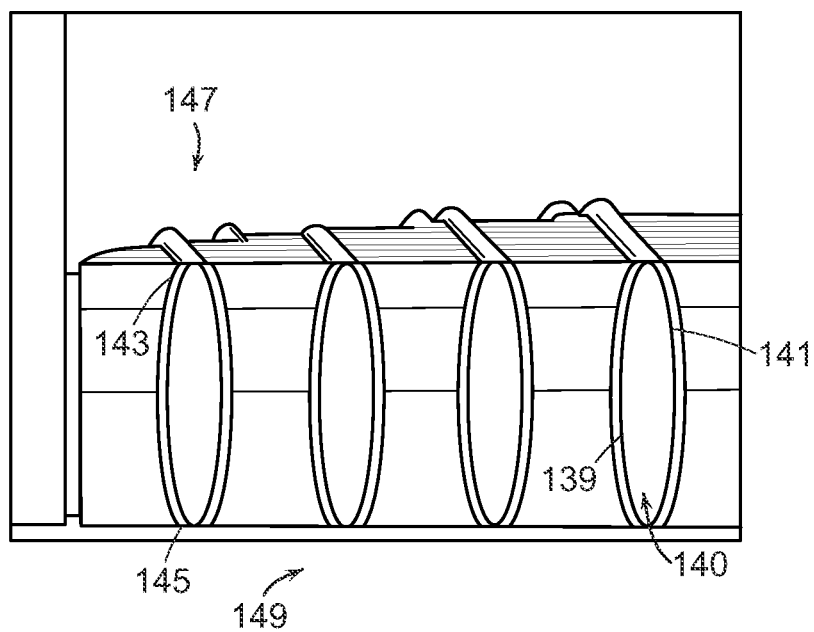
FIG. 9 shows a side cutaway view of an embodiment of a grid.
Figure 10:
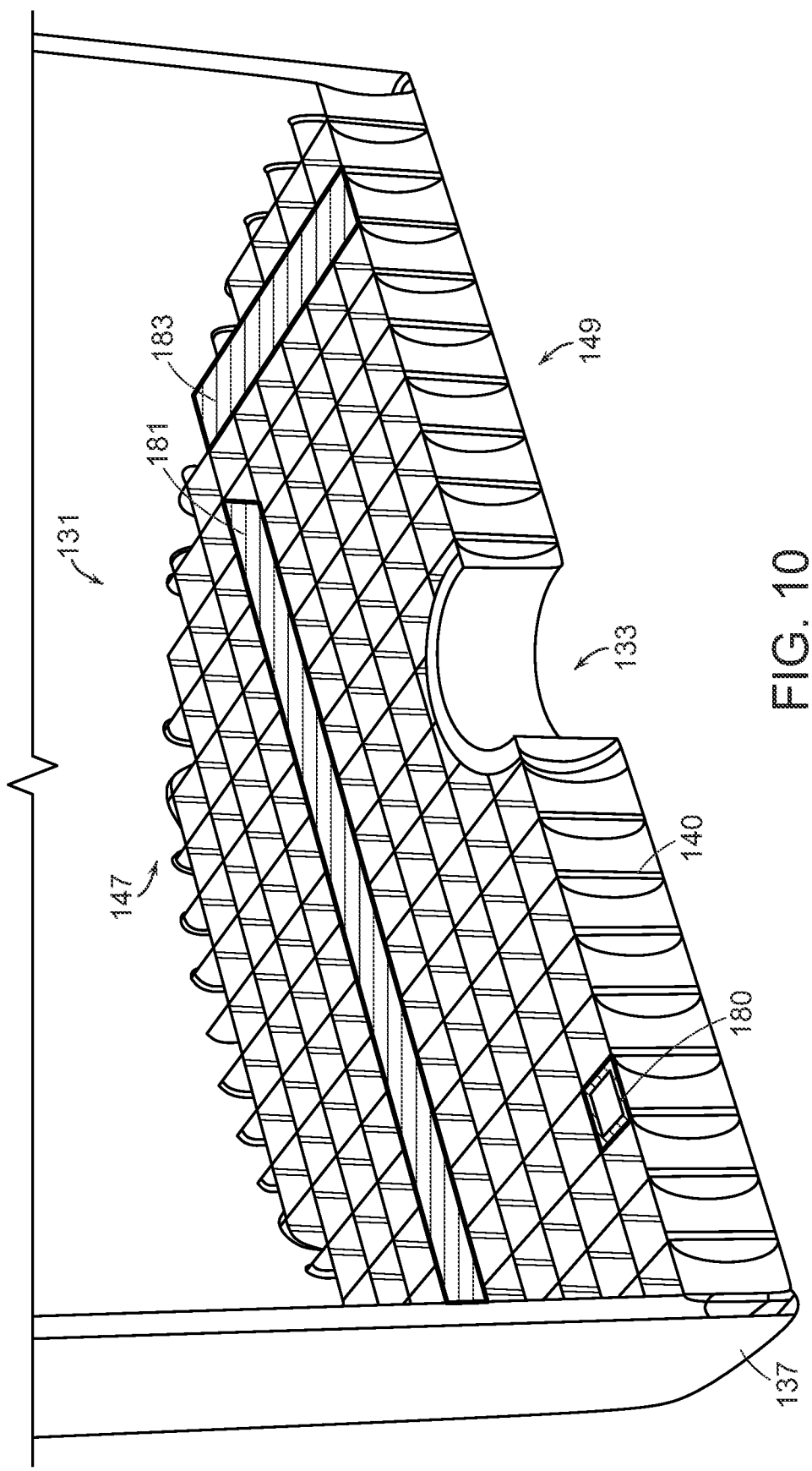
FIG. 10 shows a cutaway view of an embodiment of a grid.

FIG. 8 is a top, plan view of an embodiment of a grid member consistent with the present disclosure. FIGS. 9 and 10 are side and perspective view, partly in section of the grid member, illustrating the shape of the beams forming the grid portion. The grid member 131 comprises a framework of a first set of beams and a second set of beams arranged relative to one another, each beam 140 in the first and second sets includes a substantially elliptical cross-sectional shape. Each beam 140 comprises two opposing, arcuate sidewalls 139, 141 that converge with one another at respective top ends 143 and bottom ends 145 of each sidewall to form corresponding top surfaces 147 and bottom surfaces 149 of the beam 140. The first set of beams are substantially parallel with and spaced apart from one another and oriented in a first direction 181 and the second set of beams are substantially parallel with and spaced apart from one another and oriented in a second direction 183 perpendicular to the first direction. The first and second sets of beams traverse one another, thereby forming a grid. As shown, the grid portion comprises a plurality of square-shaped openings 180 defined between the first and second sets of beams allowing fluid to flow therethrough. In preferred embodiments, each square-shaped opening 180 in the plurality of openings is ¼ square inch. The grid member 131 comprises a central opening 133 substantially aligned with the nozzle to allow unimpeded fluid flow from the nozzle through the grid member 131.

Figure 12:
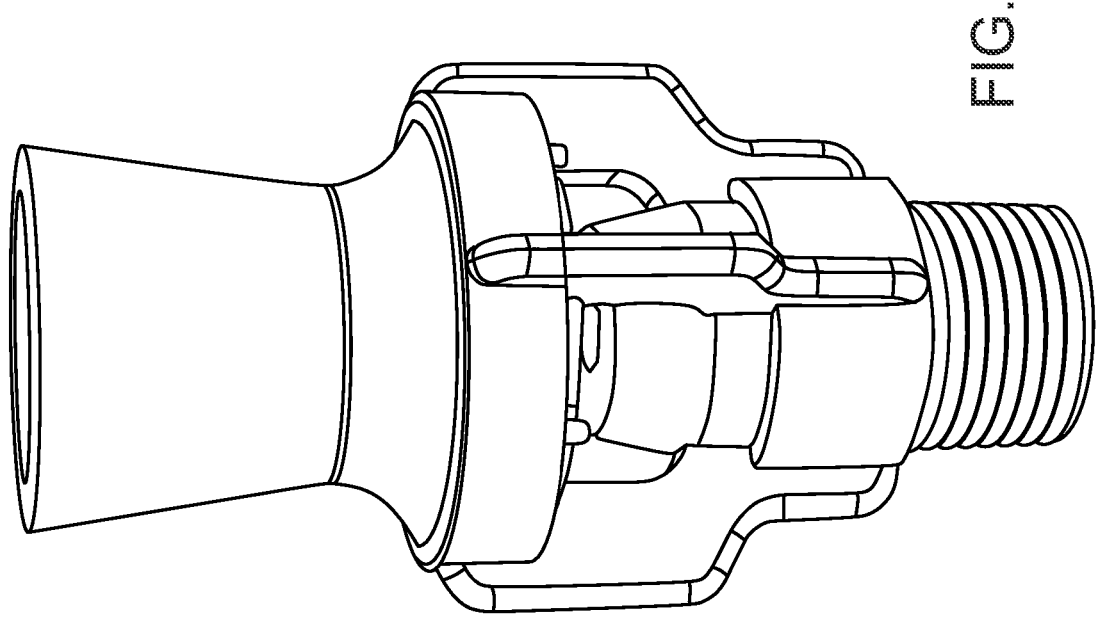
FIG. 12 shows a perspective view of an embodiment of a nozzle.
Figure 11:
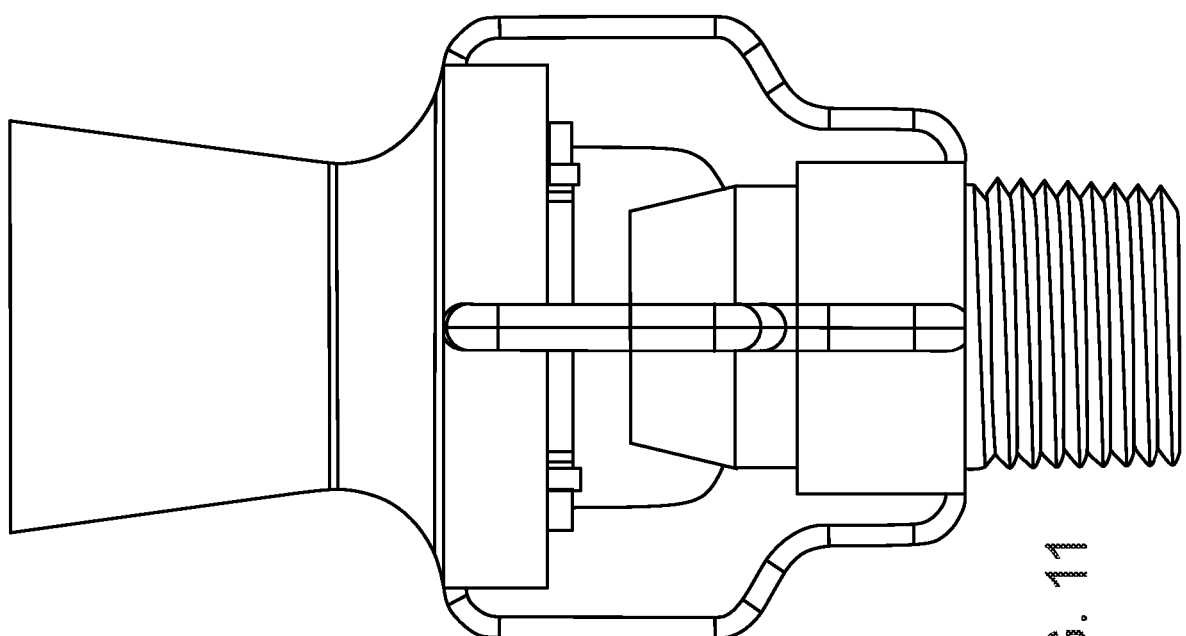
FIG. 11 shows a front view of an embodiment of a nozzle.

FIGS. 11 and 12 show front and perspectives views of an embodiment of a nozzle that may be used in the invention. Any suitable nozzle may be used in the invention. In some embodiments, the nozzle is an eductor having fluid intake ports to create a venturi effect and thereby draw fluid in the inner chamber into the eductor. Eductor nozzles are typically positioned under the surface of fluid in a tank in order to keep the fluid in motion. The liquid in the tank is circulated through the eductors to ensure that sedimentation or liquid separation does not occur. Eductors have gaps at the back of the nozzle casing that allow surrounding fluid to be drawn in and moved in addition to fluid being pumped through the nozzle, thereby allowing about 5 times the amount of pumped fluid to be moved by an eductor. Any suitable eductor may be used in the invention. For example eductors manufactured by SNP, the Spray Nozzle People (Bete Limited, United Kingdom). Accordingly, the devices 100 are designed to produce an ideal concentration of chlorine, in contrast to conventional chemical feeders. For example, conventional chemical feeders, such as cal hypo erosion chlorinators, generally produce a low concentration of solution, which, in turn, requires the use of a centrifugal pump to remove the high volume of low concentration solution from the chemical feeder and into the overall water supply/filter system (i.e., a pool or the like). The chlorine concentration passing through the pump can cause failure of the pump in a short period of time. In contrast to conventional systems and devices, a higher concentration of chlorine is produced by the devices 100, such that a pump and venturi injector are used to remove a sufficient volume of a prepared chemical solution from the device to thereby treat a large commercial swimming pool, for example.

The nozzles used in the devices 100 include an entrainment feature that recirculates the solution in the dissolving bowl sufficiently to cause more intimate contact of the solution with the briquettes/tablets, thereby increasing the concentration before the solution exits the dissolving bowl. Furthermore, The position (height) of the outlet and cross sectional area is such that the solution will rise up into the briquette/tablet bed when about 2 to about 4 gpm of flow is put through the inlet nozzle. When flow is terminated, the solution drops below the top of the grid portion, thereby keeping the chemical out of the water and stopping the dissolution process. Such a feature maintains a consistent high chlorine concentration (about 0.8%) and prevents briquette/tablet mushing.

Moreover, the bottom surface of the grid is pointed, which allows water to more freely flow towards the briquettes/tablets sitting on top of the grid, thereby enhancing the impact on the briquettes from the flow out of the nozzle. In contrast, a flat surface would diminish the impact of water flow towards the briquettes/tablets. In addition, there is a hole in the grid directly above the nozzle horn. The hole allows the high volume of flow from the nozzle to penetrate into the bed unimpeded by any deflection from the grid. This results in a higher concentration of solution than would be attained without the hole. The grid has about a ¼ inch open square pattern. The top and the bottom of the grid are pointed, and beams have an elliptical shape. The thickness of the grid is about ½ inch, measuring from the bottom point to the top point of each elliptically-shaped grid beam. In certain embodiments, the beams and grid are created by injection molding.

The about ¼ inch square openings allow sufficient flow through the grid while holding the solid chemical pieces above the grid until the chemical solids are small enough to be of no consequence. If the chemical solids are too large and fall to the bottom of the dissolving bowl where the nozzle is located, the nozzle could become blocked. In particular, if the pieces were too big, the nozzle would experience diminished flow due to a blocked entrainment feature, thereby lowering the dissolving rate of the tablets and chlorine output rate of the entire system. The grid pattern of about ¼ inch open square between structural components of the grid provides the highest concentration without allowing briquette fragments large enough to impede entrainment to fall through the grid into the dissolving bowl.

The invention provides water treatment devices that avoid scale deposition. Conventional cal hypo erosion chlorinators suffer from scale deposition. Scale deposition on the grid and the build-up of insoluble particulates in the feeder cause maintenance issues requiring acid cleaning and mechanical removal of the solids. However, the present invention minimizes the deposition of scale by providing a shaped grid. The shape at the top of the grid is pointed with almost no horizontal surface area, preventing water from sitting on the top of the grid and minimizing the deposition of scale typically produced on a horizontal portion of a grid supporting cal hypo briquettes/tablets when the surface dries out between feed episodes.

Moreover, the thickness of the grid allows the bottom of the grid to stay submerged under the water. In some embodiments, the grid thickness is about ½ inch. Because the bottom of the grid stays submerged, the invention prevents the drying process between feed episodes during which the layer of scale is typically deposited. Therefore, the invention keeps the bottom of the grid relatively free from scale build-up.

The grid also protects the outlet from being plugged by any briquettes or tablets or portions thereof so that uniform, optimum flow is achieved through the dissolving bowl. In the event that the outlet does somehow still become blocked, there are a series of overflow holes in the dissolving bowl that keep the chemical feeder from overflowing cal hypo solution. In an embodiment, the dissolving bowl comprises about eight overflow holes.

Furthermore, devices of the invention are designed to avoid accumulation of solids that may cause blockage within the device or system. The outlet flow of the dissolving bowl is directed to fall near the outlet port for the feeder to enhance the removal of solids from the feeder base. Gravity is used to supply the energy needed to agitate the solution in the base, thereby suspending the particles so they can be more easily removed with the outlet flow. The base of the feeder is contoured such that it facilitates the suspension of solids when combined with the agitation flow supplied by either fresh pool water or recirculated solution in the feeder based with flow generated by a mag drive recirculation pump. The suspension of solids allows for removal of the solids as the chlorinated solution is evacuated from the base tank with either a dosing pump or venturi. The placement of the inlet or recirculating flow works in conjunction with the contour of the base to direct the flow of solids to the central portion of the tank. At the central portion of the tank, the solids are pulled through the recirculation system, such as in a municipal design embodiment, or directed to the outlet valve, such as in a pool embodiment.

In certain embodiments, calcium hypochlorite, which is made by chlorinating lime, is the type of chlorine used in the feeder. The process produces calcium hypochlorite at about 68-72% purity. The other about 30% is made up of inert salts, mostly calcium, with about 3% being calcium carbonate or chalk, which is nearly insoluble. The calcium carbonate ($CaCO_3$) must be kept suspended in order to flow out of the bowl with the chlorinated solution. The shape of the bowl, including the slope of the walls and having the nozzle in the middle, facilitates the movement of the insoluble particles towards the nozzle, where the most vigorous agitation of the solution keeps the insoluble material in suspension. The inlet flow through the nozzle orifice creates a high velocity stream through the horn of the nozzle. The high velocity stream creates a low pressure that pulls the surrounding fluid in the bowl into the stream, thereby increasing the overall flow through the horn by about 3-4 fold. The increase is overall flow with inlet flow of about 3 gpm creates a flow through the nozzle horn of approximately about 9-12 gpm. That entrainment feature is used in the invention to suspend the solids for removal from the feeder dissolving bowl.

Additionally, the invention reduces the amount of maintenance required for conventional chemical feeder devices. The direction of the solid particles to the inlet of the recirculation pump has the added benefit of reducing the size of the particles, such as by pulverization, as the particles pass through the recirculation pump, allowing for easier suspension of the smaller particles. If particles stay in suspension, the particles are removed by the outlet flow from the feeder. Research has shown that particles with greater than about 800 micron diameters are difficult to keep in suspension with agitation. The particles are retained inside the feeder and require maintenance of the feeder with physical removal.

In the invention, the fresh pool water agitation uses very high pulsed flow directed to lift particles into suspension for removal with the outlet flow, which is in stark contrast to the lower flow continuous flush systems used in conventional systems. The pulsed flow is necessary to avoid overwhelming the outlet flow capacity while providing the energy required to suspend, or flush, particulates from the feeder base tank.

According to another aspect of the disclosure, methods for preparing chemical solution include providing a chemical feeder with a housing having an upper chamber and a lower chamber. A dissolving bowl is disposed at an interface of the upper chamber and the lower chamber. The dissolving bowl has a grid disposed centrally therein. A nozzle is disposed proximal to the grid and oriented so as to discharge water vertically upward toward the grid.

Figure 13:
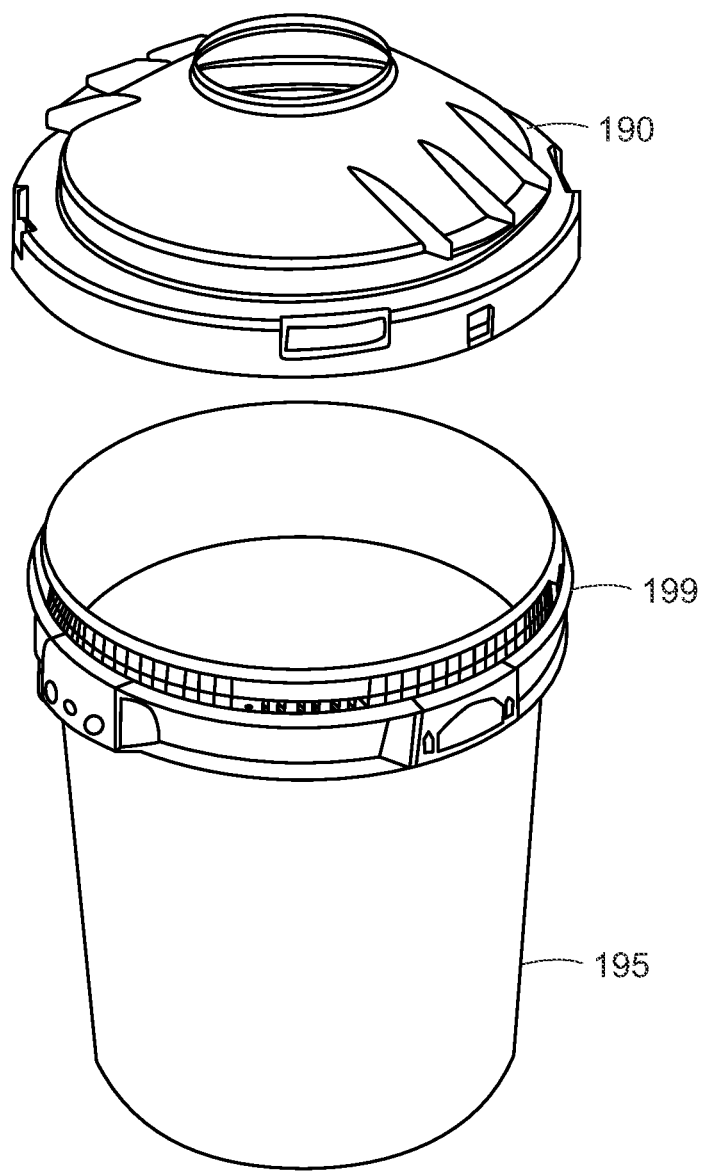
FIG. 13 shows assembly of an embodiment of a dustless funnel-capped bucket.

FIG. 13 shows assembly of an embodiment of a dustless funnel-capped bucket. Devices of the invention allow attachment of a funnel lid or cap 190 to a bucket 195 that contains chemical materials. Typically, users come into contact with harmful chemicals when loading a water treatment device with the chemical material. For example, in conventional chemical feeders, loading the feeders with solid briquettes or tablets of chemical material creates airborne chemical dust. Inhalation and other contact of chemicals used for water treatment, such as calcium hypochlorite (cal hypo), can cause severe burning and irritation of the eyes, skin, nose, and throat.

In the present invention, dustless loading of the briquettes/tablets is accomplished with a bucket/hopper mating system. The lid of the bucket is removed and replaced with a funnel type lid that has an interlocking feature that holds the funnel securely on the bucket once installed. Once the funnel is securely installed on the bucket, the bucket can be lifted and inverted onto the female feature on the hopper, similar to a water cooler loading process. Such a transition can be accomplished by most persons, allowing for the placement of the bucket onto the hopper with virtually no dust escaping during the process. The bucket is then rotated clockwise to interlock the bucket on the hopper, such as with a 20 degree turn.

The bucket can be removed after a few minutes have passed, allowing the dust to settle inside the feeder. Alternatively, the bucket can be left in place to serve as the feeder lid. In certain embodiments, the bucket can be used for extra capacity. In that example, the bucket is inverted onto the hopper with a nearly full hopper of briquettes/tablets. The funnel is interlocked onto the hopper, thereby increasing the hopper capacity by nearly 50 pounds. Such an option may be desirable in instances such as long week-ends when no operators are present.

Figure 14:
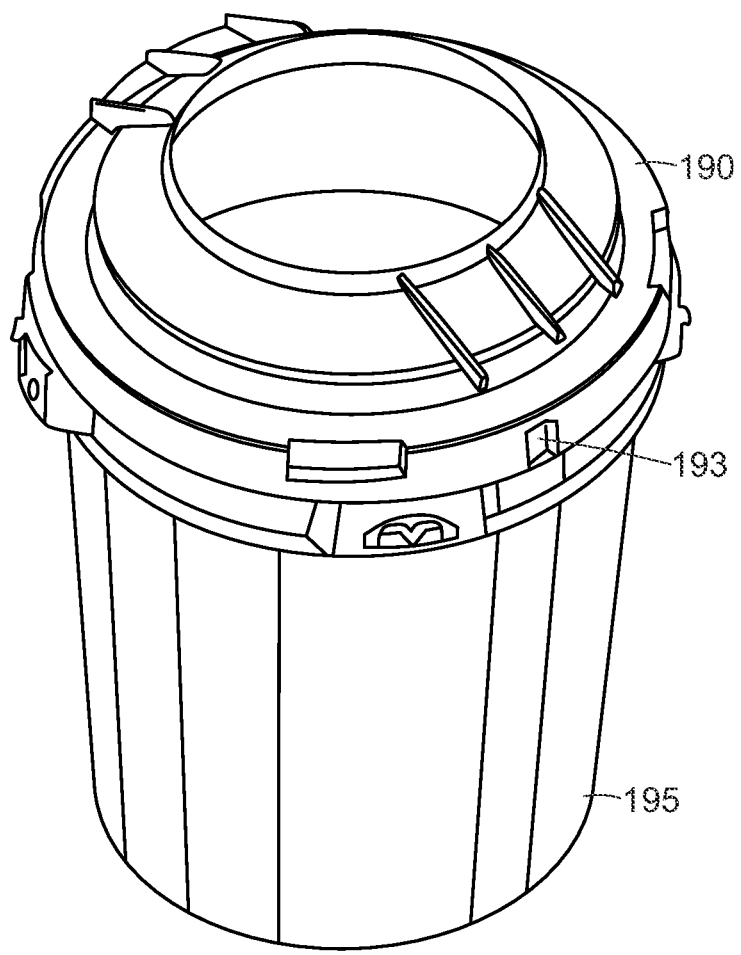
FIG. 14 shows an embodiment of a funnel coupled to a chemical material bucket.

FIG. 14 shows an embodiment of a funnel lid 190 coupled to a chemical material bucket 195. The funnel lid is releasably attached or releasably coupled to a top rim 199 of the bucket. A clasp or latch 193 may be used to attach the funnel lid 190 to the bucket 195. To attach the funnel lid 190 to the bucket 195, a user engages the clasp or latch 193. To release the funnel lid 190, a user disengages the latch or clasp 193. The clasp, latch, lever, or other interlocking feature 193 requires a deliberate placement of the hand on the feature 193, such as depressing the clasp or latch 193, while simultaneously rotating the funnel lid 190 counterclockwise to remove the funnel lid 190 from the bucket 195. Such a feature of the invention is provided for safety reasons, thereby preventing inadvertent removal of the funnel lid 190 from the bucket 195 when the bucket 195 is inverted on the hopper and is full of briquettes or tablets. In certain embodiments of the invention, the funnel lid 190 is secured to the bucket 195 while the bucket 195 is stationary and the funnel lid 190 is rotated clockwise onto a top rim 199 of the bucket 195. The clasp or latch 193 has a feature, such as an angled detent or tooth, which allows the funnel lid 190 to be screwed onto the bucket 195 with a clockwise rotation. The funnel lid 190 is removed from a stationary bucket 195 by depressing the latch 193 and rotating the funnel lid 190 counterclockwise off of the bucket 195.

The upper chamber includes an opening for loading of chemical material into the housing and into the dissolving bowl. The opening comprises a connection fitting configured to engage with a corresponding connection fitting of a separate bucket member containing a chemical material. The connection fittings of the opening of the upper chamber and the bucket member comprise interlocking engagement fittings configured to releasably couple the bucket member to the upper chamber. The bucket member comprises a lid coupled thereto, wherein the lid comprises a funnel-shaped body tapering in diameter from a wider first end directly coupled to an open end of the bucket member to a narrower second end positioned a distance from the first end and away from the bucket member interlocks with a funnel lid for a bucket containing chemical material.

Figure 15:
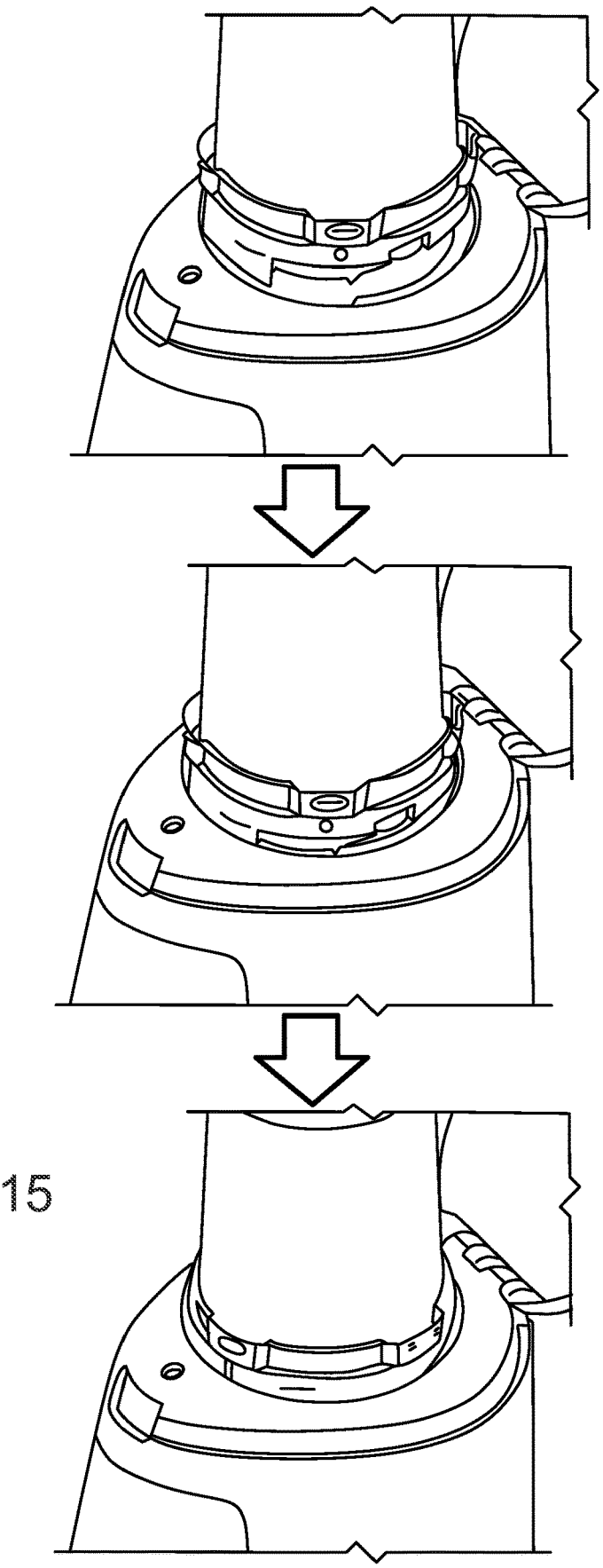
FIG. 15 shows an embodiment of coupling a chemical material bucket to a water treatment device.

FIG. 15 shows an embodiment of coupling a chemical material bucket to a water treatment device. The funnel lid allows the bucket to be attached to the upper chamber. The lid of the upper chamber is opened. The funnel-capped bucket is inverted and placed at an opening at the top of the upper chamber. Rotating the funnel-capped bucket in a clockwise direction interlocks the funnel-capped bucket with the upper chamber. Rotating the funnel-capped bucket in a counterclockwise direction releases the funnel-capped bucket from the upper chamber.

Figure 16:
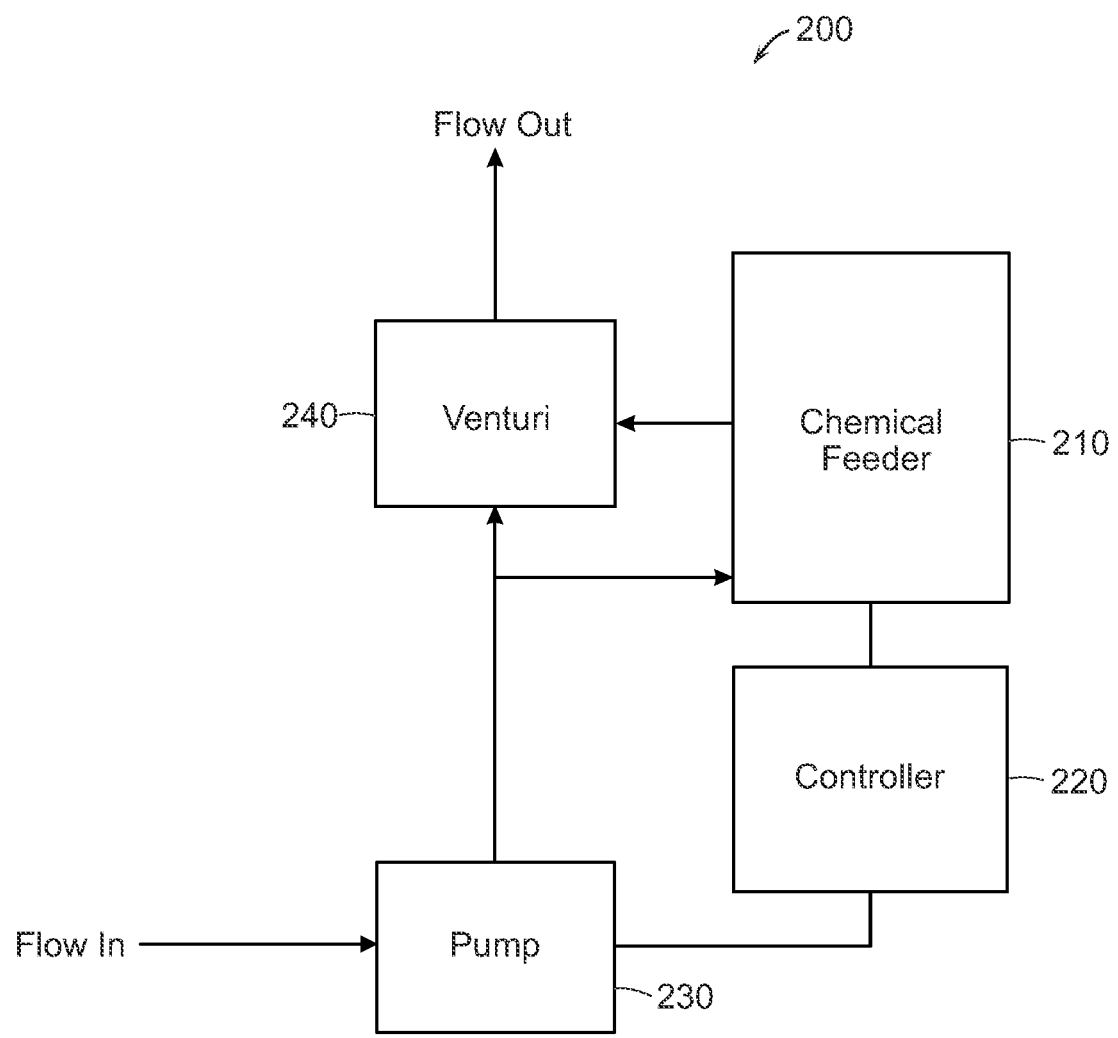
FIG. 16 shows an embodiment of a system according to the invention.

FIG. 16 shows an embodiment of a system 200 according to the invention. The system 200 comprises a chemical feeder 210, a controller 220, a pump 230, and optionally, a venturi 240. The pump 230 is used to pump fluid through a pipe. The fluid flows from the pump 230 to a venturi feature 240 in the pipe, such as a venturi valve or pump, which creates a constriction within the pipe that varies flow characteristics of the fluid flowing through the tube. The fluid may also flow from the pump 230 through the pipe and to the chemical feeder 210. The fluid that flow through the chemical feeder 210 is treated, and treated fluid is output from the chemical feeder 210 to the venturi 240 to continue traveling through the pipe to provide chemically treated water.

The flow into the chemical feeder from the high pressure created by the pump 230, such as a booster pump, is split into two streams when it enters the chemical feeder 210. One stream sends water to a solenoid that controls flow to the nozzle(s) that make the chlorine solution. The second stream sends water to a solenoid that control flow to rinse or washdown or agitation nozzles. By using electronic control of the solenoids, through programming, shorter bursts of higher flow are provided to more efficiently agitate to solution. The agitation keeps insoluble material in suspension for removal with the flow of chlorine solution out of the base of the feeder. Sufficient head space has been built into the discharge tank of the chemical feeder to accommodate the short periods of high flow that may overwhelm the outlet flow created by the venturi. The duration will be 15 seconds to 1 minute at a flow rate of 3-5 gpm. Most feed system venturis generate 3 gpm outlet flow. Therefore, any flow over 3 gpm will eventually overwhelm the outlet flow and must be controlled with a timer. The consequence of not having the timer would be to trip a high level switch that would trigger an alarm and terminate inlet flow by closing the solenoid or to engage a mechanical overflow valve that would terminate inlet flow before it reached the solenoids. Such an alarm would be disconcerting for operators. Moreover, the mechanical valve engagement would lead to poor performance of the unit, as the inlet flow was pinched off slowly resulting in diminished chlorine output.

The pump 230 is communicatively coupled to the controller 220. The controller 220 is communicatively coupled to the chemical feeder 210. The controller 220 may also be communicatively coupled to other features of a water treatment system, such as sensors indicating chlorine level upstream and downstream of the chemical feeder. The controller controls the flow of fluid to the chemical feeder. In certain embodiments, the controller provides pulsed flow through the chemical feeder. The flow of fluid from the nozzle causes a fluid level in the lower chamber to rise to above a top surface of the grid. Stopping flow of fluid from the nozzle causes the fluid level in the lower chamber to drop below the top surface of the grid. In some embodiments, the system further comprises a recirculation pump for reducing particle size of solid chemical material.

Aspects of the present disclosure described herein, such as control of the movement of fluid through the system, as described above, and the monitoring and controlling of various parameters, can be performed using any type of controller or computing device, such as a computer or programmable logic controller (PLC), that includes a processor, e.g., a central processing unit, or any combination of computing devices where each device performs at least part of the process or method. Accordingly, methods of the present disclosure can be performed using software, hardware, firmware, hardwiring, or combinations of any of these. Features implementing functions can also be physically located at various positions, including being distributed such that portions of functions are implemented at different physical locations (e.g., chemical feeder in one room and host workstation in another, or in separate buildings, for example, with wireless or wired connections).

In some embodiments, systems and methods described herein may be performed with a handheld device, e.g., a smart tablet, a smart phone, or a specialty device produced for the system. For example, processors suitable for the execution of computer program include, by way of example, both general and special purpose microprocessors, and any one or more processor of any kind of digital computer. Generally, a processor will receive instructions and data from a read-only memory or a random access memory or both. Elements of computer are a processor for executing instructions and one or more memory devices for storing instructions and data. Generally, a computer will also include, or be operatively coupled to receive data from or transfer data to, or both, one or more non-transitory mass storage devices for storing data, e.g., magnetic, magneto-optical disks, or optical disks. In some embodiments, sensors on the system send process data via Bluetooth to a central data collection unit located outside of an incubator. In some embodiments, data is sent directly to the cloud rather than to physical storage devices. Information carriers suitable for embodying computer program instructions and data include all forms of non-volatile memory, including by way of example semiconductor memory devices, (e.g., EPROM, EEPROM, solid state drive (SSD), and flash memory devices); magnetic disks, (e.g., internal hard disks or removable disks); magneto-optical disks; and optical disks (e.g., CD and DVD disks). The processor and the memory can be supplemented by, or incorporated in, special purpose logic circuitry.

The subject matter described herein can be implemented as one or more computer program products, such as one or more computer programs tangibly embodied in an information carrier (e.g., in a non-transitory computer-readable medium) for execution by, or to control the operation of, data processing apparatus (e.g., a programmable processor, a computer, or multiple computers). A computer program (also known as a program, software, software application, app, macro, or code) can be written in any form of programming language, including compiled or interpreted languages (e.g., C, C++, Perl), and it can be deployed in any form, including as a stand-alone program or as a module, component, subroutine, or other unit suitable for use in a computing environment. Systems and methods of the invention can include instructions written in any suitable programming language known in the art, including, without limitation, C, C++, Perl, Java, ActiveX, HTML5, Visual Basic, or JavaScript.

Reference throughout this specification to "one embodiment" or "an embodiment" means that a particular feature, structure, or characteristic described in connection with the embodiment is included in at least one embodiment. Thus, appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

The terms and expressions which have been employed herein are used as terms of description and not of limitation, and there is no intention, in the use of such terms and expressions, of excluding any equivalents of the features shown and described (or portions thereof), and it is recognized that various modifications are possible within the scope of the claims. Accordingly, the claims are intended to cover all such equivalents.

Various modifications of the invention and many further embodiments thereof, in addition to those shown and described herein will become apparent to those skilled in the art from the full contents of this document. The subject matter herein contains important information, exemplification and guidance that can be adapted to the practice of this invention in its various embodiments and equivalents thereof.

The invention claimed is:

1. An apparatus for preparing a chemical solution comprising:
 a housing comprising a lower chamber and an upper chamber;
 a dissolving bowl arranged at an interface of the lower chamber and upper chamber, the dissolving bowl comprising an open-ended top rim portion in communication with the upper chamber for receiving a chemical material therefrom and a closed bottom portion;
 a grid disposed within the dissolving bowl and arranged between the top rim portion and the closed bottom portion of the dissolving bowl, the grid for supporting solid, undissolved chemical material on a top surface thereof and maintaining physical separation of solid, undissolved chemical material from at least the bottom portion of the dissolving bowl; and a nozzle disposed within the dissolving bowl and positioned proximate the bottom portion, the nozzle is arranged to direct flow of aqueous fluid into the dissolving bowl and towards the grid to thereby cause aqueous fluid to contact and dissolve at least some chemical material and create a chemical solution of aqueous fluid and dissolved chemical material based, at least in part, on fluid flow from the nozzle.

2. The apparatus of claim 1, wherein the dissolving bowl comprises a plurality of apertures arranged about the top rim portion.

3. The apparatus of claim 2, wherein the plurality of apertures are in communication with the lower chamber and allow for overflow of fluid to pass from the dissolving bowl to the lower chamber.

4. The apparatus of claim 1, wherein the grid comprises a framework of a first set of beams and a second set of beams arranged relative to one another, each beam in the first and second sets includes a substantially elliptical cross-sectional shape.

5. The apparatus of claim 4, wherein each beam comprises two opposing, arcuate sidewalls that converge with one another at respective top and bottom ends of each sidewall to form corresponding top and bottom surfaces of the beam.

6. The apparatus of claim 4, wherein the first set of beams are substantially parallel with and spaced apart from one another and oriented in a first direction and the second set of beams are substantially parallel with and spaced apart from one another and oriented in a second direction perpendicular to the first direction.

7. The apparatus of claim 6, wherein the first and second sets of beams traverse one another.

8. The apparatus of claim 7, wherein the grid comprises a plurality of square-shaped openings defined between the first and second sets of beams allowing fluid to flow therethrough.

9. The apparatus of claim 1, wherein the grid comprises a central opening substantially aligned with the nozzle to allow unimpeded fluid flow from the nozzle through the grid.

10. The apparatus of claim 9, wherein the nozzle is centrally positioned within the dissolving bowl.

11. The apparatus of claim 1, wherein the nozzle comprises an eductor oriented to discharge fluid in a direction towards the grid and away from the bottom portion of the dissolving bowl.

12. The apparatus of claim 1, wherein the upper chamber includes an opening for loading of chemical material into the housing and into the dissolving bowl.

13. The apparatus of claim 12, wherein the opening comprises a connection fitting configured to engage with a corresponding connection fitting of a separate bucket member containing a chemical material.

14. The apparatus of claim 13, wherein the connection fittings of the opening of the upper chamber and the bucket member comprise interlocking engagement fittings configured to releasably couple the bucket member to the upper chamber.

15. The apparatus of claim 13, wherein the bucket member comprises a lid coupled thereto, wherein the lid comprises a funnel-shaped body tapering in diameter from a wider first end directly coupled to an open end of the bucket member to a narrower second end positioned a distance from the first end and away from the bucket member.

16. The apparatus of claim 1, further comprising an emergency shut off valve.

17. The apparatus of claim 1, wherein the dissolving bowl comprises an outlet provided along a portion of a sidewall of the dissolving bowl and proximate to the grid, the outlet in fluid communication with the lower chamber and allowing for chemical solution to flow from the dissolving bowl into the lower chamber.

18. The apparatus of claim 17, wherein the outlet is substantially aligned with a bottom surface of the grid such that, upon termination of fluid flow from the nozzle, a settled volume of fluid retained within the dissolving bowl falls below the top surface of the grid while remaining in contact with the bottom surface of the grid.

19. The apparatus of claim 17, wherein outlet flow from the dissolving bowl is directed to fall into the lower chamber near a chemical solution outlet port of the apparatus.

20. The apparatus of claim 19, wherein the lower chamber comprises a contoured base with a low section defined at a center the contoured base.

21. The apparatus of claim 20, wherein inlet flow provided to the lower chamber functions in combination with the contoured base to direct flow of any solid, undissolved chemical material included in the chemical solution towards the low section of the contoured base to thereby remove the solid, undissolved chemical material from the chemical solution and away from the outlet port of the apparatus.

22. A system for preparing a chemical solution comprising:

a chemical feeder comprising:
 a dissolving bowl arranged within a housing and comprising an open-ended top rim portion in communication with an upper chamber for receiving a chemical material therefrom and a closed bottom portion;
 a grid disposed within the dissolving bowl and arranged between the top rim portion and the closed bottom portion of the dissolving bowl, the grid for supporting solid, undissolved chemical material on a top surface thereof and maintaining physical separation of solid, undissolved chemical material from at least the bottom portion of the dissolving bowl, and
 a nozzle disposed within the dissolving bowl and positioned proximate the bottom portion, the nozzle arranged to direct flow of aqueous fluid into the dissolving bowl and towards the grid to thereby cause aqueous fluid to contact and dissolve at least some chemical material and create a chemical solution of aqueous fluid and dissolved chemical material based, at least in part, on fluid flow from the nozzle;
a pump for pumping aqueous fluid into the chemical feeder; and
a controller communicatively coupled with the chemical feeder and the pump and configured to control the pump and aqueous fluid flow through the chemical feeder.

23. The system of claim 22 wherein the controller provides pulsed flow through the chemical feeder.

24. The system of claim 23, wherein a pulse of fluid flow from the nozzle causes a fluid level to rise to above a top surface of the grid.

25. The system of claim 24, wherein stopping the pulse of fluid flow from the nozzle causes the fluid level to drop below the top surface of the grid.

26. The system of claim 22, further comprising a recirculation pump that recirculates fluid and material in the chemical feeder and reduces particle size of solid chemical material.

* * * * *